US012657776B2

(12) United States Patent (10) Patent No.: US 12,657,776 B2
Zhu                                           (45) Date of Patent:      Jun. 16, 2026

(54) DECODING METHOD, ENCODING METHOD, DECODER, AND ENCODER BASED ON POINT CLOUD ATTRIBUTE PREDICTION

(71) Applicant: TENCENT TECHNOLOGY (SHENZHEN) COMPANY LIMITED, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 353 days.

(21) Appl. No.: 18/051,713

(22) Filed: Nov. 1, 2022

(65) Prior Publication Data

US 2023/0086264 A1      Mar. 23, 2023

Related U.S. Application Data

(63) Continuation of application No. PCT/CN2022/075560, filed on Feb. 8, 2022.

(30) Foreign Application Priority Data

Mar. 12, 2021   (CN) ......................... 202110278568.X

(51) Int. Cl.
   *G06T 9/00*        (2006.01)
   *G06T 9/40*        (2006.01)
(52) U.S. Cl.
   CPC ................ *G06T 9/001* (2013.01); *G06T 9/40* (2013.01)
(58) Field of Classification Search
   CPC ........... G06T 9/001; G06T 9/40; G06T 9/004; H04N 21/2343; H04N 21/4402;
   (Continued)

(56) References Cited

U.S. PATENT DOCUMENTS 10,897,269 B2 *  1/2021  Mammou ............... H03M 7/30
10,911,787 B2 *  2/2021  Tourapis .............. H04N 19/124
   (Continued)

FOREIGN PATENT DOCUMENTS

CN      110298281 A  * 10/2019  ............. G06V 20/46
CN      110708560 A     1/2020
   (Continued)

OTHER PUBLICATIONS

L. Wei, S. Wan, Z. Sun, X. Ding and W. Zhang, "Weighted Attribute Prediction Based on Morton Code for Point Cloud Compression," 2020 IEEE International Conference on Multimedia & Expo Workshops (ICMEW), London, UK, 2020, pp. 1-6, doi: 10.1109/ ICMEW46912.2020.9105953 (Year: 2020).*

(Continued)

*Primary Examiner* — Charles T Shedrick
(74) *Attorney, Agent, or Firm* — Sughrue Mion, PLLC

(57)                ABSTRACT

In the field of computer vision, a decoding method, an encoding method, a decoder, and an encoder based on point cloud attribute prediction are provided. The decoding method includes: parsing a code stream of a point cloud to obtain reconstructed information of position information of a target point; selecting candidate points of the target point from decoded points in the point cloud; selecting neighbor points from the candidate points based on the reconstructed information of the position information of the target point; determining a predicted value of attribute information of the target point by using attribute values of the neighbor points; and obtaining a decoded point cloud based on the predicted value of the attribute information of the target point. Neighbor points with attributes similar to that of a target point are selected where possible to predict attribute information of the target point, thereby reducing the prediction complexity.

16 Claims, 9 Drawing Sheets

(58) Field of Classification Search

CPC .... H04N 19/13; H04N 19/124; H04N 19/176; H04N 19/186; H04N 19/50; H04N 19/96

See application file for complete search history.

(56) References Cited

U.S. PATENT DOCUMENTS

| | | | | |
|---|---|---|---|---|
| 2019/0080483 A1* | 3/2019 | Mammou | | G06T 3/4007 |
| 2019/0081638 A1* | 3/2019 | Mammou | | H04N 19/436 |
| 2019/0311499 A1* | 10/2019 | Mammou | | G06T 7/50 |
| 2019/0311501 A1* | 10/2019 | Mammou | | G06T 9/001 |
| 2020/0021844 A1* | 1/2020 | Yea | | H04N 19/124 |
| 2020/0021856 A1* | 1/2020 | Tourapis | | H04N 19/13 |
| 2020/0105025 A1* | 4/2020 | Yea | | G06T 15/08 |
| 2021/0209812 A1* | 7/2021 | Han | | G06T 9/001 |
| 2021/0329055 A1* | 10/2021 | Hur | | H04L 65/762 |
| 2022/0292723 A1* | 9/2022 | Wan | | G06T 9/001 |
| 2022/0329833 A1* | 10/2022 | Yang | | H04N 19/119 |
| 2022/0343550 A1* | 10/2022 | Yang | | G06F 16/22 |
| 2023/0047400 A1* | 2/2023 | Zhu | | G06T 9/001 |
| 2023/0051431 A1* | 2/2023 | Zhu | | H04N 19/597 |
| 2023/0059625 A1* | 2/2023 | Hur | | H04N 19/91 |
| 2023/0082456 A1* | 3/2023 | Zhu | | H04N 19/105 382/232 |
| 2023/0086264 A1* | 3/2023 | Zhu | | G06T 9/40 382/232 |
| 2023/0326090 A1* | 10/2023 | Yuan | | G06T 9/40 |
| 2023/0351640 A1* | 11/2023 | Yu | | G06T 9/001 |
| 2024/0087174 A1* | 3/2024 | Zhu | | G06T 17/00 |
| 2024/0112373 A1* | 4/2024 | Zhang | | G06T 9/001 |
| 2024/0185470 A1* | 6/2024 | Ramasubramonian | | H04N 19/597 |
| 2024/0355003 A1* | 10/2024 | Yuan | | G06T 9/00 |
| 2024/0412419 A1* | 12/2024 | Mammou | | G01S 7/4808 |

FOREIGN PATENT DOCUMENTS

| | | |
|---|---|---|
| CN | 110996098 A | 4/2020 |
| CN | 111145090 A | 5/2020 |
| CN | 111405281 A | 7/2020 |
| WO | 2020/190090 A1 | 9/2020 |

OTHER PUBLICATIONS

International Search Report for PCT/CN2022/075560 dated Apr. 18, 2022.

Written Opinion for PCT/CN2022/075560 dated Apr. 18, 2022.

Extended European Search Report issued Mar. 19, 2024 in Application No. 22766110.5.

Translation of Written Opinion dated Apr. 18, 2022 issued in International Application No. PCT/CN2022/075560.

* cited by examiner

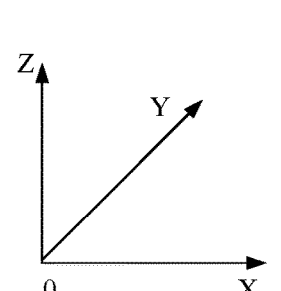
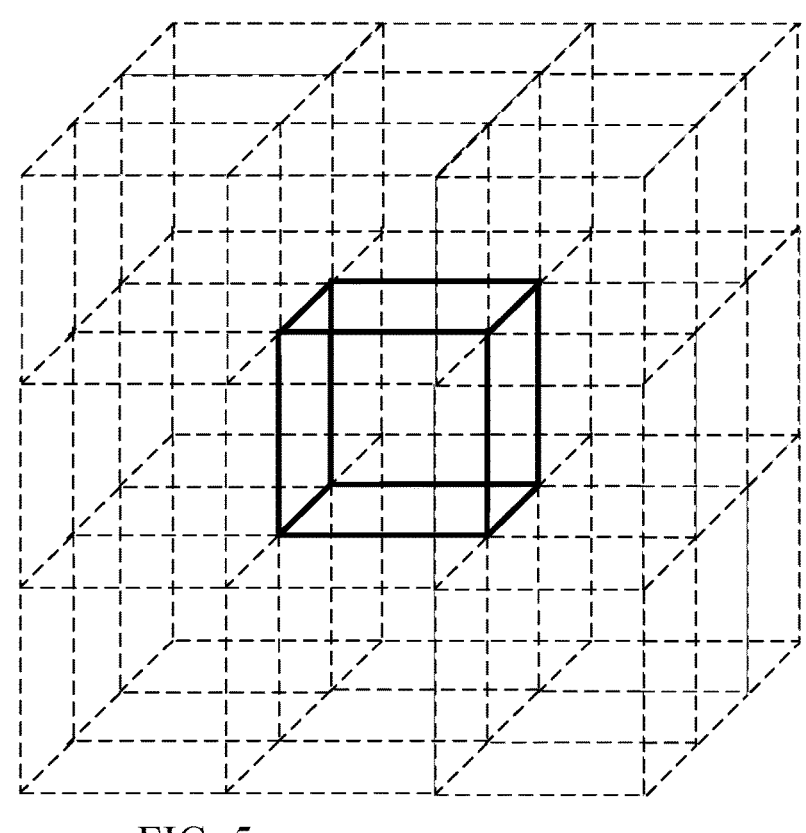
FIG. 5
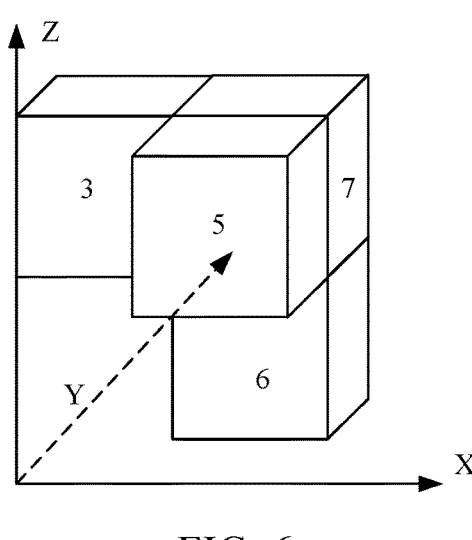
FIG. 6

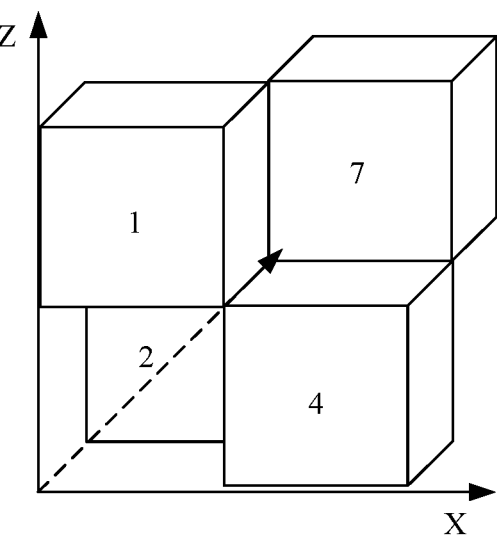

| S310 |
| Acquire reconstructed information of position information of a target point in a point cloud |

S310

Select N encoded points from M encoded points in the point cloud as N candidate points of the target point, M≥N≥1

S320

Select k neighbor points from the N candidate points based on the reconstructed information of the position information of the target point, N≥k≥1

S330

Determine a predicted value of attribute information of the target point by using attribute values of the k neighbor points, the attribute values of the k neighbor points being reconstructed values of attribute information of the k neighbor points or original values of the attribute information of the k neighbor points

S340

Obtain a residual value of the attribute information of the target point according to the predicted value of the attribute information of the target point and an original value of the attribute information of the target point

S350

Encode the residual value of the attribute information of the target point to obtain a code stream of the point cloud

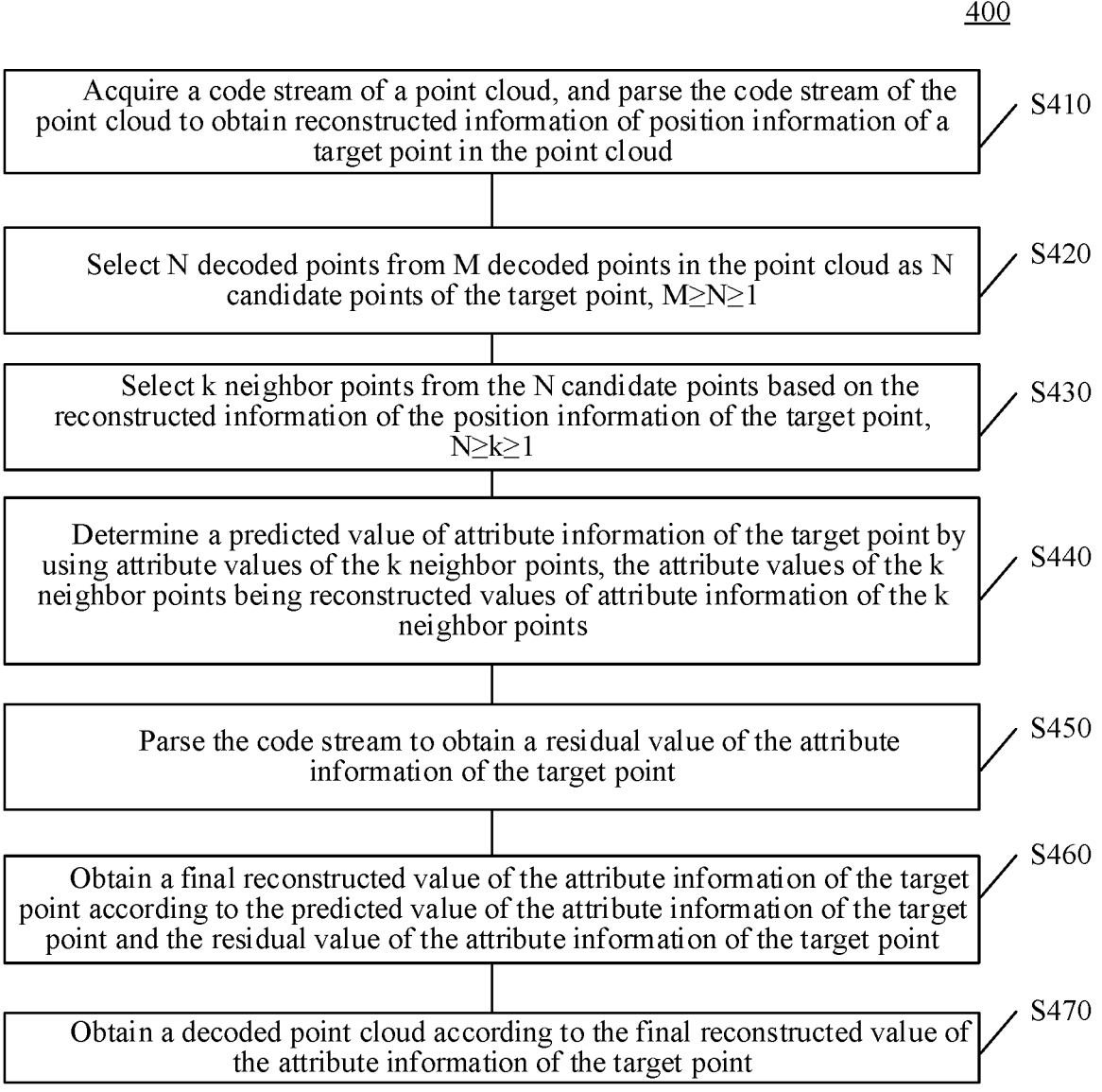

400

Acquire a code stream of a point cloud, and parse the code stream of the point cloud to obtain reconstructed information of position information of a target point in the point cloud — S410

Select N decoded points from M decoded points in the point cloud as N candidate points of the target point, M≥N≥1 — S420

Select k neighbor points from the N candidate points based on the reconstructed information of the position information of the target point, N≥k≥1 — S430

Determine a predicted value of attribute information of the target point by using attribute values of the k neighbor points, the attribute values of the k neighbor points being reconstructed values of attribute information of the k neighbor points — S440

Parse the code stream to obtain a residual value of the attribute information of the target point — S450

Obtain a final reconstructed value of the attribute information of the target point according to the predicted value of the attribute information of the target point and the residual value of the attribute information of the target point — S460

Obtain a decoded point cloud according to the final reconstructed value of the attribute information of the target point — S470

FIG. 9

DECODING METHOD, ENCODING METHOD, DECODER, AND ENCODER BASED ON POINT CLOUD ATTRIBUTE PREDICTION

CROSS-REFERENCE TO RELATED APPLICATIONS

This application is a bypass continuation of International Application No. PCT/CN2022/075560, filed with the World Intellectual Property Organization on Feb. 8, 2022, which claims priority to Chinese Patent Application No. 202110278568.X, filed with the China National Intellectual Property Administration on Mar. 12, 2021, both of which are incorporated herein by reference in their entireties.

BACKGROUND

1. Field

Embodiments of this disclosure relate to the field of computer vision (image) technologies of artificial intelligence, in particular, to the field of point cloud encoding and decoding technologies, and more specifically, to a decoding method, an encoding method, a decoder, and an encoder based on point cloud attribute prediction.

2. Description of Related Art

Point clouds have begun to spread to various fields, such as virtual/augmented reality, robots, geographic information systems, and the medical field. With the continuous improvement of the benchmark degree and speed of scanning devices, a large quantity of point clouds on the surfaces of objects can be accurately acquired, and there may usually be hundreds of thousands of corresponding points in one scenario. Such a large quantity of points also brings challenges to the storage and transmission of computers. Therefore, compression for points has become a hot issue.

For compression of a point cloud, it is mainly necessary to compress position information and attribute information thereof. Specifically, octree encoding is performed on the position information of the point cloud first; and after points used for predicting a predicted value of attribute information of a current point are selected from encoded points according to the position information of the current point after the octree encoding, the attribute information of the current point is predicted based on the selected points, and then color information is encoded by making a difference with an original value of the attribute information, to realize the encoding of the point cloud.

In the process of predicting attribute information, how to reduce the prediction complexity on the basis of ensuring the prediction effects is a technical problem to be resolved urgently in the art.

SUMMARY

According to various embodiments provided in this disclosure, a decoding method, an encoding method, a decoder, and an encoder based on point cloud attribute prediction are provided.

According to an aspect, this application provides a decoding method based on point cloud attribute prediction, including:

acquiring a code stream of a point cloud, and parsing the code stream of the point cloud to obtain reconstructed information of position information of a target point in the point cloud;

selecting N decoded points from M decoded points in the point cloud as N candidate points of the target point, $M \geq N \geq 1$;

select k neighbor points from the N candidate points based on the reconstructed information of the position information of the target point, $N \geq k \geq 1$; and determining a predicted value of attribute information of the target point by using attribute values of the k neighbor points, the attribute values of the k neighbor points being reconstructed values of attribute information of the k neighbor points;

parsing the code stream to obtain a residual value of the attribute information of the target point;

obtaining a final reconstructed value of the attribute information of the target point according to the predicted value of the attribute information of the target point and the residual value of the attribute information of the target point; and obtaining a decoded point cloud according to the final reconstructed value of the attribute information of the target point.

According to another aspect, this application provides an encoding method based on point cloud attribute prediction, including:

acquiring reconstructed information of position information of a target point in a point cloud;

selecting N encoded points from M encoded points in the point cloud as N candidate points of the target point, $M \geq N \geq 1$;

selecting k neighbor points from the N candidate points based on the reconstructed information of the position information of the target point, $N \geq k \geq 1$; and determining a predicted value of attribute information of the target point by using attribute values of the k neighbor points, the attribute values of the k neighbor points being reconstructed values of attribute information of the k neighbor points or original values of the attribute information of the k neighbor points;

obtaining a residual value of the attribute information of the target point according to the predicted value of the attribute information of the target point and an original value of the attribute information of the target point; and encoding the residual value of the attribute information of the target point to obtain a code stream of the point cloud.

According to another aspect, this application provides a decoder based on point cloud attribute prediction, and configured to perform the decoding method based on point cloud attribute prediction according to the second aspect or implementations thereof. Specifically, the decoder includes functional modules configured to perform the decoding method based on point cloud attribute prediction according to the second aspect or implementations thereof.

In an implementation, the encoder includes:

a parsing unit, configured to acquire a code stream of a point cloud, and parse the code stream of the point cloud to obtain reconstructed information of position information of a target point in the point cloud;

a prediction unit, configured to: select N decoded points from M decoded points in the point cloud as N candidate points of the target point, $M \geq N \geq 1$; select k neighbor points from the N candidate points based on the reconstructed information of the position information of the target point, $N \geq k \geq 1$; and determine a predicted value of attribute information of the target point by using attribute values of the k neighbor points, the attribute values of the k neighbor points being reconstructed values of attribute information of the k neighbor points;

the parsing unit being further configured to parse the code stream to obtain a residual value of the attribute information of the target point;

a residual unit, configured to obtain a final reconstructed value of the attribute information of the target point according to the predicted value of the attribute information of the target point and the residual value of the attribute information of the target point; and a decoding unit, configured to obtain a decoded point cloud according to the final reconstructed value of the attribute information of the target point.

According to another aspect, this application provides an encoder based on point cloud attribute prediction, and configured to perform the encoding method based on point cloud attribute prediction according to the first aspect or implementations thereof. Specifically, the encoder includes functional modules configured to perform the encoding method based on point cloud attribute prediction according to the first aspect or implementations thereof.

In an implementation, the encoder includes:

an acquisition unit, configured to acquire reconstructed information of position information of a target point in a point cloud;

a prediction unit, configured to: select N encoded points from M encoded points in the point cloud as N candidate points of the target point, $M \geq N \geq 1$; select k neighbor points from the N candidate points based on the reconstructed information of the position information of the target point, $N \geq k \geq 1$; and determine a predicted value of attribute information of the target point by using attribute values of the k neighbor points, the attribute values of the k neighbor points being reconstructed values of attribute information of the k neighbor points or original values of the attribute information of the k neighbor points;

a residual unit, configured to obtain a residual value of the attribute information of the target point according to the predicted value of the attribute information of the target point and an original value of the attribute information of the target point; and an encoding unit, configured to encode the residual value of the attribute information of the target point to obtain a code stream of the point cloud.

According to another aspect, this application provides a codec device, including:

a processor, suitable for implementing computer instructions; and a computer-readable storage medium, storing computer instructions, the computer instructions being suitable for being loaded by the processor to perform the encoding and decoding methods according to either of the first aspect and the second aspect or implementations thereof.

In an implementation, there is one or more processors, and there is one or more memories.

In an implementation, the computer-readable storage medium may be integrated with the processor, or the computer-readable storage medium may be arranged separately from the processor.

According to another aspect, an embodiment of this application provides a computer-readable storage medium, storing computer instructions, the computer instructions, when read and executed by a processor of a computer device, causing the computer device to perform the encoding and decoding methods according to either of the first aspect and the second aspect or implementations thereof.

In embodiments of this disclosure, after N decoded points are selected from M decoded points in a point cloud as N candidate points of a target point, and k neighbor points are selected from the N candidate points based on reconstructed information of position information of the target point. For a dense point cloud, an excessively large quantity of candidate points for selecting the k neighbor points can be avoided, thereby reducing the prediction complexity. According to another aspect, a predicted value of attribute information of the target point is determined by using attribute values of the k neighbor points, which can ensure prediction accuracy for the attribute information of the target point. Therefore, the solution provided in this disclosure can reduce the prediction complexity on the basis of ensuring the prediction effects.

BRIEF DESCRIPTION OF THE DRAWINGS

To describe the technical solutions in the embodiments of this disclosure more clearly, the following briefly describes the accompanying drawings required for describing the embodiments. The accompanying drawings in the following description show example embodiments of this disclosure, and a person of ordinary skill in the art may derive other embodiments from these accompanying drawings without creative efforts. In addition, one of ordinary skill would understand that aspects of example embodiments may be combined together or implemented alone.

FIG. 5 is a schematic structural diagram of a spatial relationship between neighbor points according to an embodiment of this disclosure.

FIG. 6 shows an example of a Morton code relationship between neighbor points coplanar with a to-be-encoded current point within a neighborhood range according to an embodiment of this disclosure.

FIG. 7 shows an example of a Morton code relationship between neighbor points collinear with a to-be-encoded current point within a neighborhood range according to an embodiment of this disclosure.

FIG. 8 is a flowchart of an encoding method according to an embodiment of this disclosure.

FIG. 9 is a schematic flowchart of a decoding method according to an embodiment of this disclosure.

DETAILED DESCRIPTION OF EMBODIMENTS

The technical solutions in the embodiments of this disclosure are clearly described in detail below with reference to the accompanying drawings in the embodiments of this disclosure. The embodiments to be described represent some but not all of the embodiments of this disclosure. All other embodiments obtained by a person of ordinary skill in the art based on the embodiments of this disclosure without creative efforts shall fall within the protection scope of this disclosure.

Section headings are included in this Description of Embodiments. It is noted that these section headings are for convenience only and should not be interpreted as limiting the scope of the disclosure in any way.

Figure 1:
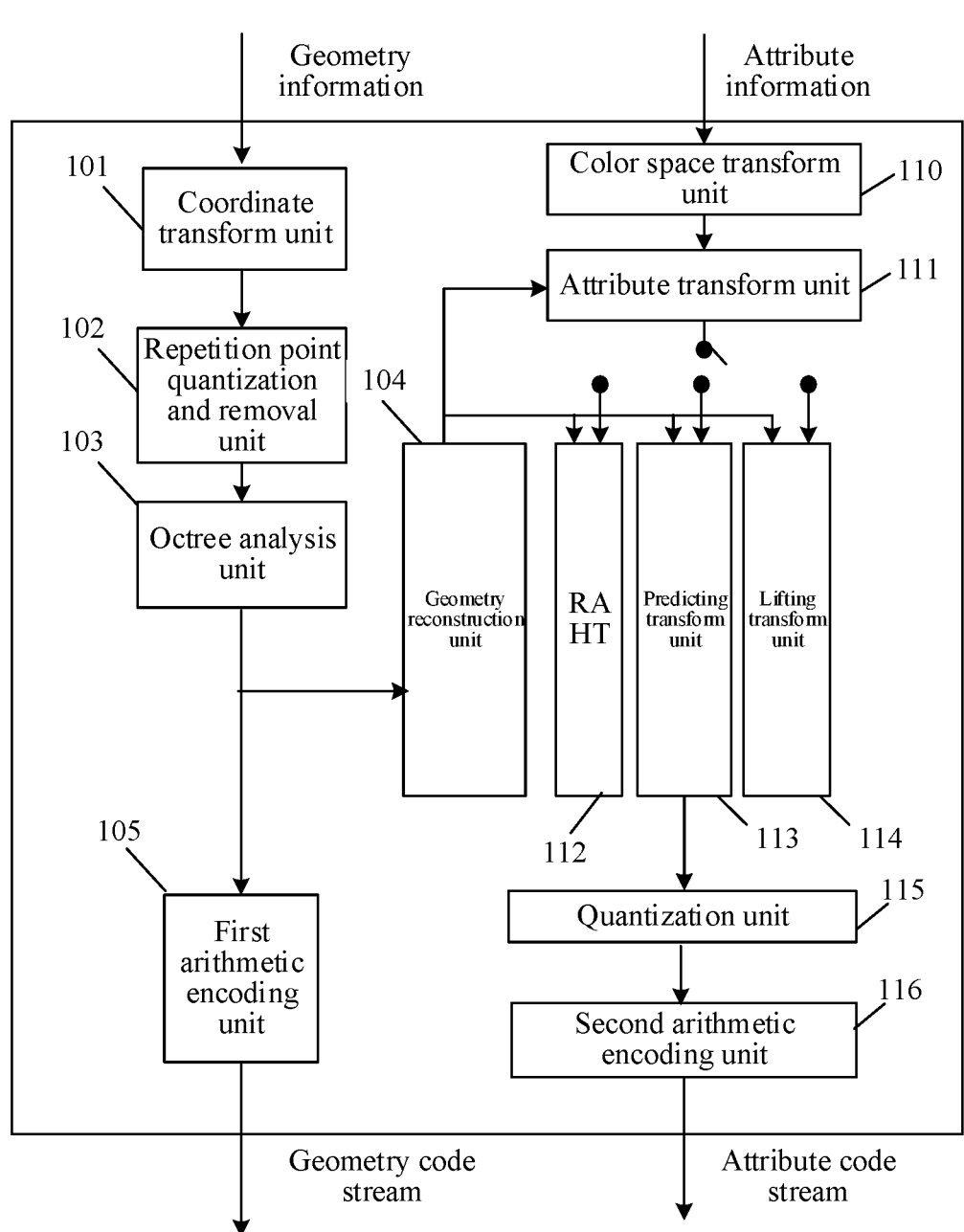
FIG. 1 is a schematic block diagram of an encoding framework according to an embodiment of this disclosure.

FIG. 1 is a schematic block diagram of an encoding framework 100 according to an embodiment of this disclosure.

As shown in FIG. 1, the encoding framework 100 may acquire position information and attribute information of a point cloud from an acquisition device. Encoding of the point cloud includes position encoding and attribute encoding. In an embodiment, the process of position encoding includes: performing preprocessing such as coordinate transformation and quantization and removal of repetition points on the original point cloud; and performing encoding after establishing an octree, to form a geometry code stream. The process of attribute encoding includes: by giving original values of the reconstructed information of the position information and the attribute information of the inputted point cloud, one of three prediction modes is selected for point cloud prediction, the predicted results are quantified, and arithmetic encoding is performed to form an attribute code stream.

As shown in FIG. 1, position encoding may be implemented by a coordinate transform unit 101, a repetition point quantization and removal unit 102, an octree analysis unit 103, a geometry reconstruction unit 104, and a first arithmetic encoding unit 105.

The coordinate transform unit 101 may be configured to pre-process points in a point cloud, that is, may be configured for coordinate transformation and voxelization. The coordinate transformation may refer to transforming world coordinates of the points in the point cloud into relative coordinates. Data of points in a point cloud in the 3D space is transformed into an integer form through a zooming operation (where the minimum value of the coordinate axes x, y, and z is subtracted from geometric coordinates of the points respectively) and a translation operation, and the minimum geometry position thereof is moved to the coordinate origin. The zooming operation for the points is equivalent to a de-direct current operation, to transform the coordinates of the points in the point cloud from world coordinates to relative coordinates.

The repetition point quantization and removal unit 102 can reduce the quantity of coordinates through geometry quantization. The fineness of quantization is usually determined by a quantization parameter (QP). A larger value of QP indicates that coefficients with a larger value range will be quantized into the same output, and consequently greater distortion and a lower bit rate are usually caused. Inversely, a smaller value of QP indicates that coefficients with a smaller value range will be quantized into the same output, so that less distortion is caused, which corresponds to a higher bit rate. In point cloud encoding, quantization is performed directly on the coordinate information of points. The same coordinates may be assigned to originally different points after quantization. Based on this, repetition points may be deleted through a deduplication operation. For example, a plurality of points with the same quantization position and different attribute information may be merged into one point through attribute transformation. In some embodiments of this disclosure, the repetition point quantization and removal unit 102 may be used as an optional unit module.

Geometry encoding includes two modes, namely, octree-based geometry encoding and triangular representation-based geometry encoding, which can be used under different conditions. The octree analysis unit 103 can encode position information of quantized points in an octree encoding manner. The octree is a tree-shaped data structure. In 3D space division, a preset bounding box is evenly divided, and each node has eight child nodes. By using '1' and '0' to indicate whether each child node of the octree is occupied or not, occupancy code information is obtained as a code stream of geometry information of the point cloud. For example, the point cloud is divided in the form of an octree, so that positions of the points may be in a one-to-one correspondence with the positions of the octree. By collecting statistics on the positions in the octree in which points exist, and recording flags thereof as 1, geometry encoding is performed. In the triangular representation-based geometry encoding, the point cloud is divided into blocks of a certain size, intersections at the edges of the blocks on the surface of the point cloud are located and a triangle is constructed, and compression of geometry information is realized by encoding positions of the intersections.

The first arithmetic encoding unit 105 may be configured for geometry entropy encoding, that is, performing statistical compression encoding for the occupancy code information of the octree, and finally outputting a binarized (0 or 1) compressed code stream. Statistical compression encoding is a lossless encoding manner that can effectively reduce the bit rate required to express the same signal. A commonly used statistical compression encoding manner may be content adaptive binary arithmetic coding (CABAC). Briefly, arithmetic encoding is performed on the position information outputted by the octree analysis unit 103 in an entropy encoding manner, that is, a geometry code stream is generated in an arithmetic encoding manner by using the position information outputted by the octree analysis unit 103. The geometry code stream may also be referred to as geometry bitstream.

In the case of lossy encoding, after the geometry information is encoded, the encoder side needs to decode and reconstruct the geometry information, that is, restore the coordinate information of each point in the 3D point cloud. For each point, reconstructed values of attribute information of one or more adjacent points corresponding to the point are searched for in the original point cloud, as a predicted value of attribute information of the point, and a residual value of the attribute information of the point is obtained based on the predicted value and an original value of the attribute information of the point. The encoder encodes the residual values of the attribute information of all points in the point cloud to obtain an attribute bitstream. The encoder can obtain a reconstructed value of the attribute information based on the predicted value and the original value of the attribute information.

Attribute encoding may be implemented by a color space transform unit 110, an attribute transform unit 111, a region adaptive hierarchical transform (RAHT) unit 112, a predicting transform unit 113, a lifting transform unit 114, a quantization unit 115, and a second arithmetic encoding unit 116.

The color space transform unit 110 may be configured to transform an RGB color space of the points in the point cloud into the YCbCr format or other formats.

The attribute transform unit 111 may be configured to transform the attribute information of the points in the point cloud to minimize attribute distortion. For example, the attribute transform unit 111 may be configured to obtain original values of the attribute information of the points. For example, the attribute information may be color information of the points. After the original values of the attribute information of the points are obtained through transformation by the attribute transform unit 111, any prediction unit may be selected to predict the points in the point cloud.

The units for performing predictive encoding on points in the point cloud may include at least one of: a region adaptive hierarchical transform (RAHT) unit 112, a predicting transform unit 113, and a lifting transform unit 114. That is, attribute transformation encoding includes three modes that can be used under different conditions. In other words, any one of the RAHT unit 112, the predicting transform unit 113, and the lifting transform unit 114 may be configured to predict attribute information of a point in the point cloud to obtain a predicted value of the attribute information of the point, and then obtain a residual value of the attribute information of the point based on the predicted value of the attribute information of the point. For example, the residual value of the attribute information of the point may be obtained by subtracting the predicted value of the attribute information of the point from the original value of the attribute information of the point. When the RAHT unit 112 is used to perform predictive encoding, after RAHT is performed on the attribute information, a signal is transformed into the transformation domain, which is referred to as a transform coefficient. When the lifting transform unit 114 is used to perform predictive encoding, based on level of detail (LOD) adjacent level prediction, the weight update policy of neighborhood points is introduced, and finally a predicted value of attribute information of each point is obtained, and a corresponding residual value is then obtained. The predicting transform unit 113 may further be configured to generate an LOD, sequentially predict attribute information of points in the LOD, and calculate a predicted residual for subsequent quantization encoding. When the predicting transform unit 113 is used to perform predictive encoding, a sub-point set is selected according to distances, and the point cloud is divided into a plurality of different levels (LOD), to realize point cloud representations from rough to fine. Bottom-top prediction can be implemented between adjacent levels. That is, the attribute information of the points introduced in the fine level is predicted from the adjacent points in the rough level, and a corresponding residual value is obtained. Points at the lowest level in the LOD are used as reference information for encoding.

The quantization unit 115 may be configured for attribute information quantization, where the fineness of quantization is usually determined by the QP. In predicting transform encoding and lifting transform encoding, entropy encoding is performed after quantizing residual values; and in RAHT, entropy encoding is performed after quantizing transform coefficients. For example, if the quantization unit 115 is connected to the predicting transform unit 113, the quantization unit may be configured to quantize a residual value of attribute information of a point outputted by the predicting transform unit 113. For example, the residual value of the attribute information of the point outputted by the predicting transform unit 113 is quantized by using a quantization operation, to improve the system performance.

During predictive encoding for attribute information, one or more points are selected as predicted values based on the adjacent relationship for the geometry information or attribute information, a weighted average is calculated to obtain a final predicted value of the attribute information, and a difference between the original value and the predicted value is encoded. An example in which the predicting transform unit 113 is used to perform predictive encoding is used. For each point in the LOD, three nearest neighbor points are found in the LOD in front of it, and then prediction is performed on a current point by using reconstructed values of the three neighbor points, to obtain a predicted value, where a Euclidean distance or a Manhattan distance may be used for distance calculation. Based on this, a residual value of the current point can be obtained based on the predicted value of the current point and an original value of the current point.

In some embodiments, the residual value may be determined based on the following formula:

$$\text{attrResidualQuant} = (\text{attrValue} - \text{attrPred})/Q \text{ step,}$$

where attrResidualQuant represents the residual value of the current point, attrPred represents the predicted value of the current point, attrValue represents the original value of the current point, and Qstep represents the quantization operation. Qstep is calculated based on the QP.

In some embodiments, the current point will serve as the nearest neighbor of subsequent points, and the reconstructed value of the current point is used to predict the attribute information of the subsequent points. The reconstructed value of the attribute information of the current point may be obtained by using the following formula:

$$\text{reconstructedColor} = \text{attrResidualQuant} \times \text{Qstep} + \text{attrPred,}$$

where reconstructedColor represents the reconstructed value of the current point, attrResidualQuant represents the residual value of the current point, Qstep represents the quantization operation, and attrPred represents the predicted value of the current point. Qstep is calculated based on the QP.

The second arithmetic encoding unit 116 may be configured for attribute information entropy encoding, and final compression of the quantized residual value or transform coefficient of the attribute information may be implemented through run length coding and arithmetic coding. Corresponding encoding modes, the QP, and other information are also encoded by using an entropy encoder. Entropy encoding is performed on the residual values of the attribute information of the points, and an attribute code stream can be obtained. The attribute code stream may be bitstream information.

In this embodiment of this disclosure, the predicted value of the attribute information of the point in the point cloud may also be referred to as a predicted color value in the LOD mode. The predicted value of the attribute information of the point is subtracted from the original value of the attribute information of the point to obtain the residual value of the point. The residual value of the attribute information of the point may also be referred to as a residual color value in the LOD mode. The reconstructed value of the attribute information of the point can be generated by adding the predicted value of the attribute information of the point and the residual value of the attribute information of the point. The reconstructed value of the attribute information of the point may also be referred to as a reconstructed color value in the LOD mode. The foregoing terms are only an exemplary description, and shall not be understood as a limitation on this disclosure.

Based on the encoding process of the encoding framework 100, after obtaining a compressed code stream, a decoder first performs entropy decoding to obtain various mode information, and quantized geometry information and quantized attribute information. First, inverse quantization is performed on the geometry information to obtain reconstructed 3D point position information. Inverse quantization is also performed on the attribute information to obtain a residual value, and a reference signal is confirmed according to the adopted transformation mode, to obtain a predicted value of the attribute information, which has a one-to-one correspondence with the geometry information in sequence, and a reconstructed value of each point is generated and outputted, that is, reconstructed point cloud data is outputted.

Figure 2:
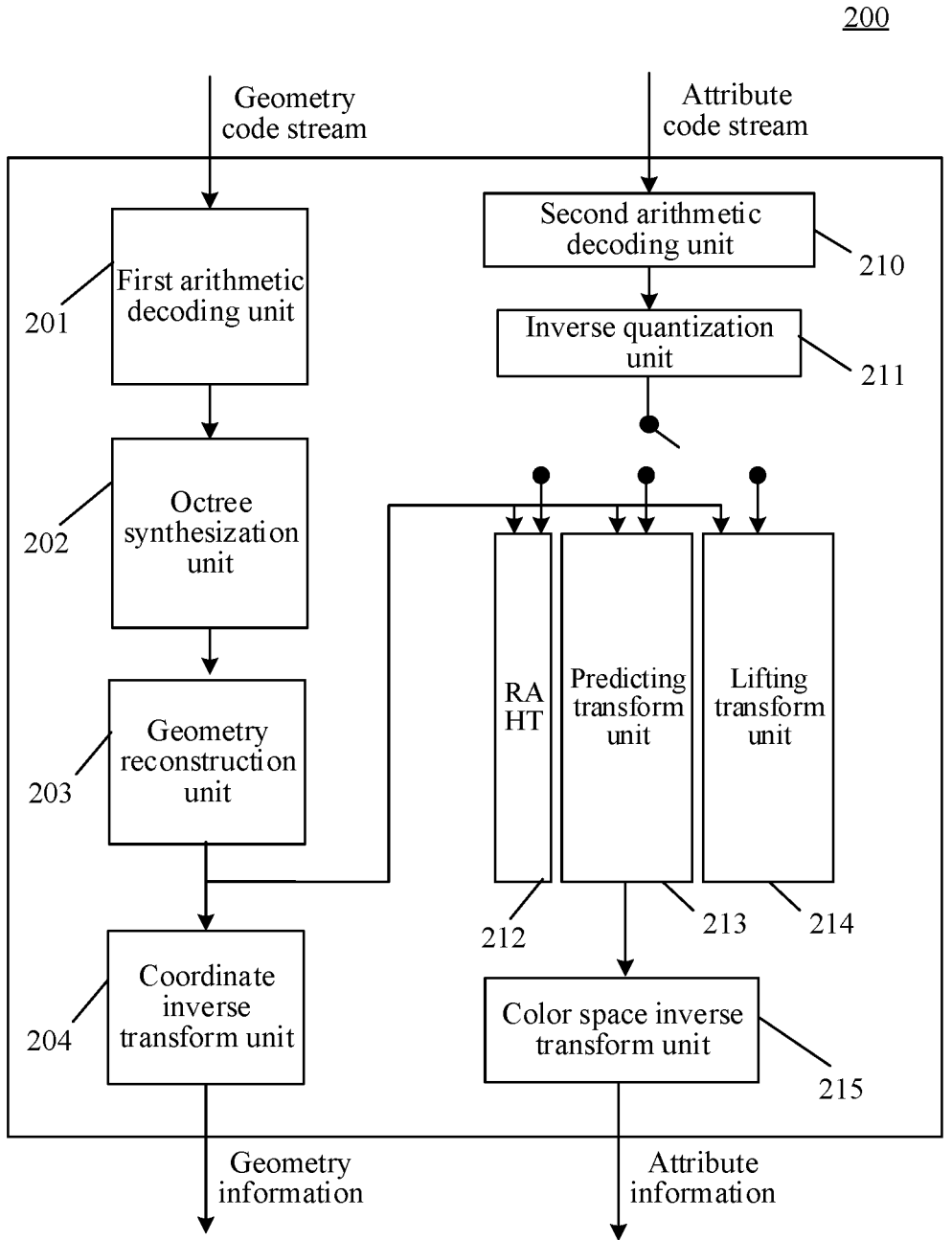
FIG. 2 is a schematic block diagram of a decoding framework according to an embodiment of this disclosure.

FIG. 2 is a schematic block diagram of a decoding framework 200 according to an embodiment of this disclosure.

As shown in FIG. 2, the decoding framework 200 may acquire a code stream of a point cloud from an encoding device, and obtain position information and attribute information of the points in the point cloud by parsing the code stream of the point cloud. The decoding of the point cloud includes position decoding and attribute decoding.

In an embodiment, the process of position decoding includes: performing arithmetic decoding on the geometry code stream; performing combination after constructing an octree, and reconstructing the position information of the points, to obtain reconstructed information of the position information of the points; and performing coordinate transformation on the reconstructed information of the position information of the points to obtain the position information of the points. The position information of the points may also be referred to as geometry information of the points.

The process of attribute decoding includes: parsing the attribute code stream to obtain residual values of the attribute information of the points in the point cloud; performing inverse quantization on the residual values of the attribute information of the points, to obtain residual values of the attribute information of the points after inverse quantization; selecting one of the three prediction modes to perform point cloud prediction based on the reconstructed information of the position information of the points obtained during position decoding, to obtain reconstructed values of the attribute information of the points; and performing color space inverse transformation on the reconstructed values of the attribute information of the points, to obtain the decoded point cloud.

As shown in FIG. 2, the position decoding may be implemented by the following units: a first arithmetic decoding unit 201, an octree analysis unit 202, a geometry reconstruction unit 203, and a coordinate inverse transform unit 204. Attribute encoding may be implemented by the following units: a second arithmetic decoding unit 210, an inverse quantization unit 211, a RAHT unit 212, a predicting transform unit 213, a lifting transform unit 214, and a color space inverse transform unit 215.

Decompression is an inverse process of compression, and similarly, for the functions of each unit in the decoding framework 200, reference may be made to the functions of the corresponding unit in the encoding framework 100. For example, the decoding framework 200 may divide the point cloud into a plurality of LODs according to the Euclidean distance between the points in the point cloud; and subsequently decode the attribute information of the points in the LOD in sequence, for example, calculate a quantity of zeros (zero_cnt) in the zero run length coding technology, to decode residuals based on the quantity of zeros. Subsequently, the decoding framework 200 may perform inverse quantization based on decoded residual values, and add the residual values after inverse quantization to the predicted value of the current point to obtain a reconstructed value of the point cloud, until all point clouds have been decoded. The current point will serve as the nearest neighbor of points in subsequent LODs, and the reconstructed value of the current point is used to predict the attribute information of the subsequent points. In addition, regarding inverse transformation and inverse quantization (scale/scaling), for orthogonal transformation, if one matrix thereof is used for transformation, another matrix is used for inverse transformation. For the decoding method, matrices used in the decoder may be referred to as "transform" matrices.

For the convenience of description, the predictive encoding methods of attribute information are described below. The predictive encoding methods of attribute information may include a predictive encoding method for reflectivity attribute information, a predictive encoding method for color attribute information, and a method for adaptively selecting an attribute predicted value.

1) A predictive encoding method for reflectivity attribute information.

I) Neighbor point selection in a Morton order.

k encoded points of the current point are found based on the offset Morton code method as neighbor points. The Morton code is a manner of representing coordinates of a point in multi-dimensional space with a one-dimensional value. By using Morton encoding, the spatial relationship corresponding to points in the space can be approximately represented by using the adjacent relationship between values of Morton codes. In other words, after Morton code encoding is performed on the point cloud, a Morton order formed by a plurality of Morton codes based on Morton sorting can be formed. Sorting refers to changing positions of a group of data according to a specific rule (sorting algorithm), so that the data is arranged in order, which may be arranged in descending order, or arranged in ascending order. Morton sorting refers to the process of sorting based on the adjacent relationship between the values of the Morton codes.

Figure 3:
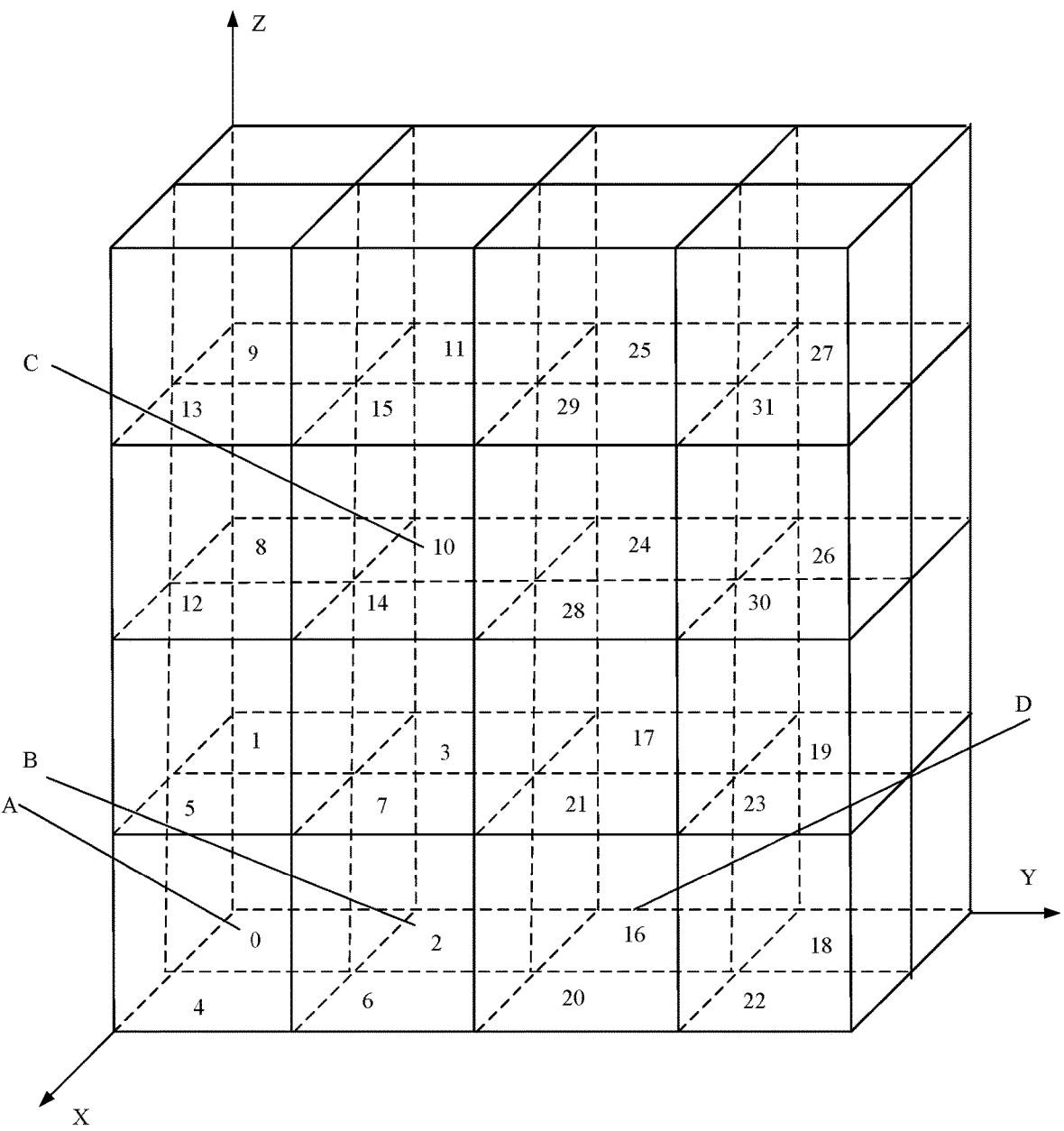
FIG. 3 is a schematic diagram of a point cloud in an original Morton order according to an embodiment of this disclosure.
Figure 4:
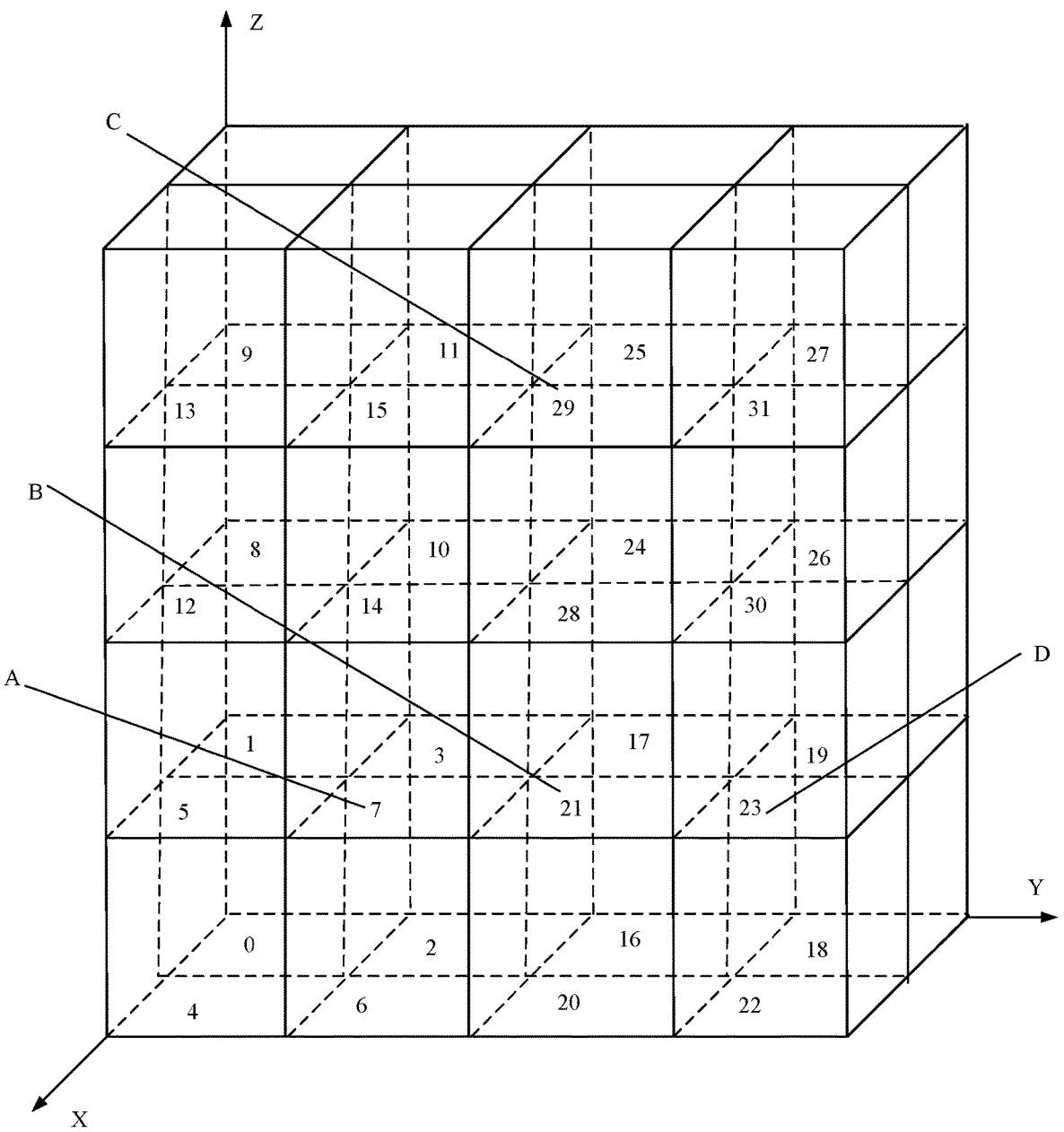
FIG. 4 is a schematic diagram of a point cloud in an offset Morton order according to an embodiment of this disclosure.

FIG. 3 is a schematic diagram of a point cloud in an original Morton order according to an embodiment of this disclosure. FIG. 4 is a schematic diagram of a point cloud in an offset Morton order according to an embodiment of this disclosure.

As shown in FIG. 3, coordinates of all points in a point cloud are acquired, and a Morton order 1 is obtained in a Morton sorting manner; a fixed value (j1, j2, 3) is added to the coordinates (x, y, z) of all the points, the new coordinates (x+j1, y+j2, z+j3) are used to generate Morton codes corresponding to the point cloud, and a Morton order 2 is obtained in a Morton sorting manner. As shown in FIG. 4, when A, B, C, and D in FIG. 3 are moved to different positions in FIG. 4, the corresponding Morton codes also change, but the relative positions remain unchanged. In addition, in FIG. 4, the Morton code of the point D is 23, and the Morton code of a neighbor point B of the point D is 21, so that the point B can be found by searching two points forward from the point D at most. However, in FIG. 3, the Morton code of the point D is 16, and the Morton code of the neighbor point B of the point D is 2, so that the point B can be found by searching 14 points forward from the point D at most.

The decoder performs decoding according to a Morton order to find the closest predicted point of the current point.

Specifically, the first N points of the current point may be selected in a Morton order 1 as candidate points, where N is greater than or equal to 1; and the first M points of the current point may be selected in a Morton order 2 as candidate points Point, where M is greater than or equal to 1. Among the N candidate points and M candidate points, a distance d from each candidate point to the current point is calculated, where the calculation may be performed by using a Euclidean distance or a Manhattan distance. For example, the coordinates of the current point are (x, y, x), the coordinates of the candidate point are (x1, y1, z1), and the method for calculating the distance d is d=|x-x1|+|y-y1|+|z-z1|. k decoded points with the shortest distance are selected from the N+M candidate points as prediction points of the current point. In an example implementation, in PCEM software, j1=j2=j3=42, k=3, and N=M=4.

ii) Neighbor point selection in a Hilbert order.

In the method for selecting neighbor points in a Hilbert order, the maximum quantity of neighbor points (maxNumOfNeighbours) previous to the current encoded point are searched in Hilbert order for k points closest to the current point as neighbor points, where maxNumOfNeighbours represents the quantity of candidate points, maxNumOfNeighbours is 128 by default, k is 3 by default, and the distance calculation method is Manhattan distance, that is, d=|x1-x2|+|y1-y2|+|z1-z21. During encoding, discrete Hilbert curves are used for calculation during Hilbert sorting.

iii) Predicted value calculation.

When calculating the predicted value of the attribute information of the current point, reciprocals of the Manhattan distances between the k selected neighbor points and the current point are used as weights, and finally a weighted average of attribute reconstruction values of the k neighbor points is calculated to obtain the predicted value of the attribute information of the current point. A serial number of the current point is set to i, the geometric coordinates of the current point are set to $(x_i, y_i, z_i)$, and the geometric coordinates of each neighbor point are set to $(x_{ij}, y_{ij}, z_{ij})$. $j=0, 1, 2, \ldots, k$, then the weight $w_{ij}$ of each neighbor point is shown in Formula 1 as follows:

$$w_{ij} = \frac{1}{|x_i - x_{ij}| + |y_i - y_{ij}| + |z_i - z_{ij}|}. \qquad \text{(Formula 1)}$$

The reconstructed value of the attribute information of each neighbor point is set to $(\hat{A}_{ij})_{j=0,1 \ldots k}$, then the predicted value $\hat{A}_i$ of the attribute information of the current point is shown in Formula 2 as follows:

$$\hat{A}_i = \frac{\sum_{j=1}^{k} w_{ij} \hat{A}_{ij}}{\sum_{j=1}^{k} w_{ij}}. \qquad \text{(Formula 2)}$$

For a reflectivity attribute, if different weights are used for components in the directions x, y, and z for the weight calculation in Formula 1, the weight $w_{ij}$ of each neighbor point is shown in Formula 3 as follows:

$$w_{ij} = \frac{1}{a|x_i - x_{ij}| + b|y_i - y_{ij}| + c|z_i - z_{ij}|}, \qquad \text{(Formula 3)}$$

where a, b, and c are different weights on the components in the directions x, y, and z respectively.

2) Predictive encoding method for color attribute information.

In the color attribute prediction method, the Morton code is first used to search for spatial neighbor points of the current point, and then the attribute prediction is performed on the current point according to the found spatial neighbor points.

FIG. 5 is a schematic structural diagram of a spatial relationship between neighbor points according to an embodiment of this disclosure. FIG. 6 shows an example of a Morton code relationship between neighbor points coplanar with a to-be-encoded current point within a neighborhood range according to an embodiment of this disclosure. FIG. 7 shows an example of a Morton code relationship between neighbor points collinear with a to-be-encoded current point within a neighborhood range according to an embodiment of this disclosure.

As shown in FIG. 5, the to-be-encoded current point is a thick line marking block A, and the neighbor search range is a 3×3×3 neighborhood of the to-be-encoded current point. Firstly, the Morton code of the current point is used to obtain the block with the smallest Morton code value in the neighborhood, and the block is used as a reference block. Encoded neighbor points that are coplanar and collinear with the to-be-encoded current point 7 are searched for by using the reference block. As shown in FIG. 6, within a neighborhood range, a to-be-encoded current point 7 is coplanar with a neighbor point 3, a neighbor point 5, and a neighbor point 6. As shown in FIG. 7, within a neighborhood range, a to-be-encoded current point 7 is collinear with a neighbor point 1, a neighbor point 2, and a neighbor point 4.

The reference block is used to search for k encoded neighbor points coplanar and collinear with the to-be-encoded current point (for example, during selection for a neighborhood, k≤6), and the k neighbor points are used to predict the attribute information of the to-be-encoded current point. For example, when k=3, neighbor points coplanar with the to-be-encoded current point are searched for within a certain range [j-maxNumOfNeighbours, j-1] of the encoded points, where an index of the current point is j, and maxNumOfNeighbours represents the quantity of candidate points. If a coplanar encoded neighbor point is found, the weight of the coplanar neighbor point is assigned to 2. The encoded points continue to be searched for neighbor points collinear with the to-be-encoded current point. If a collinear neighbor point is found in a decoded point set, a weight of the collinear neighbor point is assigned to 1. Finally, weighted averaging is performed by using the found neighbor points to perform attribute prediction on the to-be-encoded current point. If no encoded neighbor point coplanar and collinear with the to-be-encoded current point is found, a point corresponding to a previous Morton code of the to-be-encoded current point may be used to perform attribute prediction.

For example, when neighbor points are used to perform weighted averaging to perform attribute prediction on the to-be-encoded current point, if there is a coplanar point and a collinear point, a distance between the coplanar point and the current point is d1 (for example, d1=1), and the attribute value is r1; and if a distance between the collinear point and the current point is d2 (for example, d2≥2), and the attribute value is r2, the attribute predicted value of the to-be-encoded current point is r=(2*r1+r2)/(2+1).

3) A method for adaptively selecting an attribute predicted value.

In both of the prediction method for reflectivity attribute information and the prediction method for color attribute information, the predicted value of attribute information is determined according to geometric position information. The prediction method for reflectivity attribute information and the prediction method for color attribute information may be referred to as a predicted value method based on geometry positions. The predicted value method based on geometry positions is usually suitable for relatively dense and relatively predictable point clouds, such as human point clouds, or suitable for situations with a relatively small predicted residual. If a residual generated by the predicted value method based on geometry positions is large, a predicted value method based on attribute values can usually reduce the predicted residual and improve the encoding efficiency.

The predicted value method based on attribute values may be implemented through the following operations:

i) saving 32 different attribute predicted values in the encoded points that are recently encoded in a candidate predicted value table;

ii) selecting a point with attribute information closest to that of the current point from the candidate predicted value table, and using an attribute value of the selected point as the attribute predicted value of the current point; and iii) binarizing a sequence number of the selected point in the candidate predicted value table into 5 bits, and performing encoding by using entropy encoding with context.

In the prediction method for color attribute information, coplanar points and collinear points in the encoded points are found as neighbor points of the current point, and different weights are set for the coplanar points and the collinear points for weighted calculation, and finally the predicted value of the attribute information of the corresponding point is obtained. For relatively sparse point cloud data, if the probability that no coplanar point or collinear point can be found is higher than 90%, the previous point will be used for prediction in AVS encoding. A point cloud in one scene may correspond to hundreds of thousands of points. Such a large quantity of points also brings challenges to the storage and transmission of computers: directly using the coplanar points and collinear points in the encoded points as the neighbor points of the current point require an excessively large amount of computation, resulting in excessively high prediction complexity.

An embodiment of the disclosure provides a color prediction-oriented neighbor point optimization method, which can reduce the prediction complexity on the basis of ensuring the prediction effects by better utilizing the spatial correlation of the adjacent points of the point cloud. Specifically, by analyzing a spatial neighborhood relationship of point cloud data, N encoded points may be selected from M encoded points as N candidate points, then a distance-first or geometric structure-first manner is designed to select k neighbor points from the N candidate points, and finally attribute prediction is performed based on the k selected neighbor points. In this embodiment of this disclosure, the solution of selecting N candidate points from the M encoded points and the solution of selecting k neighbor points from the N candidate points may be implemented in various ways such as searching or mapping. Under different circumstances, a single selection method may be adopted, or a combination of a plurality of selection methods may be adopted to reduce the prediction complexity on the basis of ensuring the prediction effects. In addition, the point cloud attribute prediction-oriented neighbor point selection optimization method provided in this disclosure may be applied to any 3D point cloud codec product.

FIG. 8 is a flowchart of an encoding method 300 based on point cloud attribute prediction according to an embodiment of this disclosure. The method 300 may be performed by an encoder or an encoder side, for example, the encoding framework 100 shown in FIG. 1.

As shown in FIG. 8, the encoding method 300 may include:

S310: Acquire reconstructed information of position information of a target point in a point cloud.

S320: Select N encoded points from M encoded points in the point cloud as N candidate points of the target point, $M \geq N \geq 1$.

S330: Select k neighbor points from the N candidate points based on the reconstructed information of the position information of the target point, $N \geq k \geq 1$.

S340: Determine a predicted value of attribute information of the target point by using attribute values of the k neighbor points, the attribute values of the k neighbor points being reconstructed values of attribute information of the k neighbor points or original values of the attribute information of the k neighbor points.

S350: Obtain a residual value of the attribute information of the target point according to the predicted value of the attribute information of the target point and an original value of the attribute information of the target point.

S360: Encode the residual value of the attribute information of the target point to obtain a code stream of the point cloud.

Briefly, when encoding attribute information of a target point, an encoder side first selects N encoded points from M encoded points as N candidate points of the target point; then selects k neighbor points from the N candidate points; subsequently determines a predicted value of the attribute information of the target point by using attribute values of the k neighbor points; finally obtains obtain a residual value of the attribute information of the target point according to the predicted value of the attribute information of the target point and an original value of the attribute information of the target point; and encodes the residual value of the attribute information of the target point to obtain a code stream of the point cloud.

In this embodiment of this disclosure, after N encoded points are selected from M encoded points in a point cloud as N candidate points of a target point, and k neighbor points are selected from the N candidate points based on reconstructed information of position information of the target point. For a dense point cloud, an excessively large quantity of candidate points for selecting the k neighbor points can be avoided, thereby reducing the prediction complexity. According to another aspect, a predicted value of attribute information of the target point is determined by using attribute values of the k neighbor points, which can ensure prediction accuracy for the attribute information of the target point. Therefore, the above solution can reduce the prediction complexity on the basis of ensuring the prediction effects.

In some embodiments, the quantity M of encoded points exceeds the quantity N of candidate points; and S320 may include:

selecting the N encoded points from the M encoded points based on a first order of the M encoded points, the first order being an order obtained by performing Morton sorting or Hilbert sorting on the M encoded points and the target point in ascending order or in descending order, or the first order being an encoding order of the M encoded points and the target point; and using the N encoded points as the N candidate points.

In other words, the encoder side sorts the points in the point cloud, for example, using Morton codes or Hilbert codes to represent the coordinates of the points in the point cloud, and performs sorting in ascending order or in descending order; or skips performing sorting, and keeps the encoding order of the points. The encoding order of the points may also be referred to as an input order of the points. The Hilbert sorting is used as an example. A sequence number of the to-be-encoded current point is i, the corresponding Hilbert code is m_i, encoded points in the pre-order include i-1, i-2, . . . , 1, 0, and the corresponding Hilbert codes are m (i-1), m (i-2), . . . , m_1, m_0. N encoded points are selected from the encoded points with serial numbers i-1, i-2, . . . , 1, 0, that is, N candidate points are selected for the current point as candidate points of neighbor points of the current point. Suitable methods for selecting N encoded points include, but are not limited to:

1. All of the encoded points are used as candidate points.

2. Some of the encoded points are used as candidate points.

In some embodiments, S320 may include:

determining, in the first order, N points previous to and adjacent to the target point as the N encoded points; or determining, in the first order, N consecutive points previous to the target point as the N encoded points, the N consecutive points being adjacent to the target point or spaced apart from the target point by at least one encoded point.

In other words, when the encoder side uses some of the encoded points as candidate points, suitable solutions include, but are not limited to, at least one of the following methods:

1. Forward search is gradually performed in the first order, and N points are selected to be added to candidate points.

2. N points in the pre-order are selected in the first order, that is, the points with the sequence numbers i-1, i-2, . . . , i-N are selected as the candidate points.

3. N consecutive points are randomly selected from the encoded points in the first order. For example, N1 points in the pre-order are skipped, that is, N points with the sequence numbers i-N1-1, i-N1-2, . . . , i-N1-N are selected to be added to the candidate points.

In this embodiment, the N encoded points are directly selected from the M encoded points based on the first order of the M encoded points, which can effectively control the selection complexity of candidate points and improve the prediction efficiency.

In alternative embodiments, the encoder side may randomly select the N encoded points from the M encoded points, which is not specifically limited in this embodiment of this disclosure.

The first order may be an order formed by directly sorting the point cloud by the encoder side, or an order formed by merely sorting the M encoded points and the target point. For example, when the point cloud is a dense point cloud, the first order may be an order formed by merely sorting the M encoded points and the target point, and when the point cloud is a sparse point cloud, the first order may be an order formed by sorting all points in the point cloud, to reduce the workload and improve the prediction efficiency. In addition, when the encoder side sorts the points in the point cloud or merely sorts the M encoded points and the target point, all directions (x, y, z) may be processed, or one or more directions thereof may be processed, which is not specifically limited in this embodiment of this disclosure. For example, when the encoder side sorts the points in the point cloud (or merely sorts the M encoded points and the target point) according to position information of the points, the encoder side may perform Morton sorting on the points in the point cloud (or merely perform Morton sorting on the M encoded points and the target point) according to the position information of the points, or perform Hilbert sorting on the points in the point cloud (or merely perform Hilbert sorting on the M encoded points and the target point) according to the position information of the points. Optionally, the position information of the points may be three-dimensional position information of the points, or may be position information in one dimension or a plurality of dimensions. Optionally, the encoder side may determine, according to an actual requirement, position information of how many dimensions are used to sort the points in the point cloud (or the M encoded points and the target point).

After the encoder side selects the N candidate points, neighbor points for predicting the attribute information of the target point may be selected from the N candidate points.

The encoder side may calculate a distance between each of the N candidate points and the target point, and determine k neighbor points based on the distance between each candidate point and the target point; or locate the k-neighbor points meeting a condition through a geometric structure relationship of the points, for example, by using an octree structure formed based on the N candidate points and the target point; or sort the N candidate points and the target point and select k neighbor points from the sorted candidate points, for example, select k neighbor points based on an order formed by sorting the N candidate points and the target point, which is not specifically limited in this embodiment of this disclosure. The measurement manners or specific implementations adopted for the distance involved in the calculation process are not limited in this disclosure. For example, a Euclidean distance or a Manhattan distance may be adopted. The order formed by sorting the N candidate points and the target point may be an order formed by directly sorting the point cloud, or an order formed by merely sorting the N candidate points and the target point. For example, when the point cloud is a dense point cloud, the order formed by sorting the N candidate points and the target point may be an order formed by merely sorting the N candidate points and the target point, and when the point cloud is a sparse point cloud, the order formed by sorting the N candidate points and the target point may be an order formed by sorting all points in the point cloud, to reduce the workload and improve the prediction efficiency. In addition, when the encoder side sorts the points in the point cloud (or merely sorts the N candidate points and the target point), all directions (x, y, z) may be processed, or one or more directions thereof may be processed, which is not specifically limited in this embodiment of this disclosure. For example, when the encoder side sorts the points in the point cloud (or merely sorts the N candidate points and the target point) according to position information of the points, the encoder side may perform Morton sorting on the points in the point cloud (or merely perform Morton sorting on the N candidate points and the target point) according to the position information of the points, or perform Hilbert sorting on the points in the point cloud (or merely perform Hilbert sorting on the N candidate points and the target point) according to the position information of the points. Optionally, the position information of the points may be three-dimensional position information of the points, or may be position information in one dimension or a plurality of dimensions. Optionally, the encoder side may determine, according to an actual requirement, position information of how many dimensions are used to sort the points in the point cloud or the N candidate points.

In some embodiments, S330 may include:

determining a geometric structure relationship between the N candidate points and the target point based on the reconstructed information of the position information of the target point and reconstructed information of position information of the N candidate points; and selecting the k neighbor points from the N candidate points based on the geometric structure relationship.

In an implementation, the geometric structure relationship is represented by an octree structure; k nearest neighbor points of the target point are determined based on the octree structure; and the k nearest neighbor points are determined as the k neighbor points.

Briefly, the encoder side selects the k nearest neighbor points based on the octree structure as neighbor points, that is, selects the k points closest to the target point from the N candidate points. For example, the encoder side may use the k-nearest neighbor (KNN) classification algorithm to calculate and obtain the k nearest neighbor points. KNN refers to the K nearest neighbors, which is equivalent to that each point can be represented by its nearest K adjacent points.

In another implementation, p candidate points collinear and/or coplanar with the target point are selected from the N candidate points based on the geometric structure relationship; and the p candidate points are determined as the k neighbor points when the quantity p of candidate points is greater than or equal to the quantity k of neighbor points; or k candidate points are selected from the p candidate points as the k neighbor points when the quantity p of candidate points is greater than or equal to the quantity k of neighbor points. In another implementation, p candidate points collinear and/or coplanar with the target point are selected from the N candidate points based on the geometric structure relationship; distances between all of the N candidate points and the target point are determined based on the reconstructed information of the position information of the target point and the reconstructed information of the position information of the N candidate points when the quantity p of candidate points is less than the quantity k of neighbor points or the quantity p of candidate points is equal to 0; and the k neighbor points are selected from the N candidate points based on the distances between all of the N candidate points and the target point, the distances between all of the N candidate points and the target point being Euclidean distances or Manhattan distances. In another implementation, p candidate points collinear and/or coplanar with the target point are selected from the N candidate points based on the geometric structure relationship; a second order is determined by using the reconstructed information of the position information of the target point and the reconstructed information of the position information of the N candidate points when the quantity p of candidate points is less than the quantity k of neighbor points or the quantity p of candidate points is equal to 0; and the k neighbor points are selected from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

Briefly, the encoder side may select candidate points collinear and/or coplanar with the target point from the N candidate points based on the geometric structure relationship. If the quantity of candidate points collinear and/or coplanar with the target point is less than k or no candidate point collinear and/or coplanar with the target point exists, the encoder side determines the k neighbor points based on the distances between all of the N candidate points and the target point or the second order, and if the quantity of candidate points collinear and/or coplanar with the target point is greater than or equal to k, the encoder side determines all the candidate points collinear and/or coplanar with the target point as the k neighbor points or select k points from all the candidate points collinear and/or coplanar with the target point as the k neighbor points.

When selecting the k neighbor points from the N candidate points based on the distances between all of the N candidate points and the target point, the encoder side determines points in the N candidate points with a distance to the target point less than a first threshold as the k neighbor points, or determines points in the N candidate points with a distance to the target point being a second threshold as the k neighbor points. In other words, suitable methods for the encoder side to select the k neighbor points from the N candidate points include, but are not limited to, at least one of the following methods:

1. Select all points with a distance less than d as neighbor points. For example, d=2.
2. Select all points with a distance of d_0 as neighbor points. Optionally, one or more fixed values may be selected as d_0. For example, d_0 may be 1 or 2, that is, select points in a dense point cloud that are coplanar or collinear with the target point.

When selecting the k neighbor points from the N candidate points based on the second order, the encoder side may select the k neighbor points from the N candidate points based on a sequence number of the target point in the second order. In other words, when the encoder side uses some of the N candidate points as the k neighbor points, suitable solutions include, but are not limited to, at least one of the following methods:

1. Forward search is gradually performed in the second order, and k points are selected to be added to neighbor points.
2. k points in the pre-order are selected in the second order, that is, the points with the sequence numbers i-1, i-2, . . . , i-k are selected as the neighbor points.
3. k consecutive points are randomly selected from the N candidate points in the second order. For example, N1 points in the pre-order are skipped, that is, N points with the sequence numbers i-N1-1, i-N1-2, . . . , i-N1-k are selected to be added to the neighbor points.

In alternative embodiments, the encoder side may randomly select the k neighbor points from the N candidate points, which is not specifically limited in this embodiment of this disclosure.

In some embodiments, S330 may include:

determining distances between all of the N candidate points and the target point based on the reconstructed information of the position information of the target point and reconstructed information of position information of the N candidate points; and selecting the k neighbor points from the N candidate points based on the distances between all of the N candidate points and the target point, the distances between all of the N candidate points and the target point being Euclidean distances or Manhattan distances.

Because the distance between the candidate point and the target point can reflect the correlation or similarity between the attribute information of the candidate point and the attribute information of the target point, the encoder side may preferentially select, based on the distances between all of the N candidate points and the target point, the k neighbor points that meet the preset conditions or attribute prediction conditions from the N candidate points.

In an implementation, S330 may include:

determining first target candidate points in the N candidate points as the k neighbor points, the first target candidate point being a point in the N candidate points with a distance to the target point less than a first threshold; or determining second target candidate points in the N candidate points as the k neighbor points, the second target candidate point being a point in the N candidate points with a distance to the target point less than a second threshold.

In other words, suitable methods for the encoder side to select the k neighbor points from the N candidate points include, but are not limited to, at least one of the following methods:

1. Select all points with a distance less than d as neighbor points. For example, d=2.
2. Select all points with a distance of d_0 as neighbor points. Optionally, one or more fixed values may be selected as d_0. For example, d_0 may be 1 or 2, that is, select points in a dense point cloud that are coplanar or collinear with the target point.

In some embodiments, S330 may include:

determining a second order by using the reconstructed information of the position information of the target point and reconstructed information of position information of the N candidate points; and selecting the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In other words, the encoder side may select the k neighbor points from the N candidate points based on the second order according to sequence numbers. For example, the encoder side selects some of the N candidate points as the k neighbor points based on the second order of the N candidate points. For example, k points previous to the target point and adjacent to the target point are determined in the second order as the k neighbor points; or k consecutive points previous to the target point are determined in the second order as the k neighbor points, the k consecutive points being adjacent to the target point or spaced apart from the target point by at least one candidate point.

In other words, when the encoder side uses some of the N candidate points as the k neighbor points, suitable solutions include, but are not limited to, at least one of the following methods:

1. Forward search is gradually performed in the second order, and k points are selected to be added to neighbor points.
2. k points in the pre-order are selected in the second order, that is, the points with the sequence numbers i-1, i-2, . . . , i-k are selected as the neighbor points.

3. k consecutive points are randomly selected from the N candidate points in the second order. For example, N1 points in the pre-order are skipped, that is, N points with the sequence numbers i-N1-1, i-N1-2, . . . , i-N1-k are selected to be added to the neighbor points.

In alternative embodiments, the encoder side may randomly select the k neighbor points from the N candidate points, which is not specifically limited in this embodiment of this disclosure.

In some embodiments, S340 may include:

using a reciprocal of a distance between each of the k neighbor points and the target point as a weight of the each neighbor point, performing weighted averaging calculation based on the attribute value and the weight of each of the k neighbor points to obtain a weighted average value of the attribute values of the k neighbor points, and determining the weighted average value of the attribute values of the k neighbor points as the predicted value of the attribute information of the target point; or setting the same or different initial weights for different neighbor points in the k neighbor points, performing weighted averaging calculation based on the attribute value and the initial weight of each of the k neighbor points to obtain a weighted average value of the attribute values of the k neighbor points, and determining the weighted average value of the attribute values of the k neighbor points as the predicted value of the attribute information of the target point, the initial weight of one of the k neighbor points decreasing as the distance between the neighbor point and the target point increases, and the code stream including the initial weight of each of the k neighbor points; or determining the attribute value of a neighbor point in the k neighbor points that is closest to the target point as the predicted value of the attribute information of the target point.

In other words, the encoder side may use the obtained attribute values of the neighbor points to calculate the predicted value of the attribute information of the target point, and suitable calculation processes include, but are not limited to, at least one of the following methods:

1. Calculate a weighted average value according to the distances between the neighbor points and the target point. For example, the Euclidean distance measurement is used, the reciprocal of the distance is used as the weight of each neighbor point, and the predicted value is the weighted average of the attribute values of the neighbor points.
2. Calculate the weighted average value according to the set initial weights. The encoder side may set the same or different weight values for different neighbor points, for example, set a relatively large weight value for a point with a relatively short distance. The predicted value is the weighted average of attribute values of the neighbor points. Correspondingly, the decoder side may obtain the corresponding weight value by parsing the code stream.
3. Use the attribute value of the nearest neighbor point as the predicted value of the attribute value of the target point.

In some embodiments, S350 may include:

discarding first neighbor points and second neighbor points in the k neighbor points to obtain remaining neighbor points in the k neighbor points, the first neighbor point being a neighbor point in the k neighbor points with a distance to a reference point greater than a first threshold, and the second neighbor point being a neighbor point in the k neighbor points with a distance to the reference point greater than or equal to a second threshold, the k neighbor points including the reference point; and determining the predicted value of the attribute information of the target point by using the attribute values of the remaining neighbor points in the k neighbor points.

In other words, the encoder side may process the obtained neighbor points, and may the encoder side may process the obtained neighbor points, and may eliminate points with relatively large differences to avoid introducing errors Suitable approaches include, but are not limited to, at least one of the following methods:

1. Eliminate neighbor points with a relatively large distance difference in the neighbor points. For example, k nearest neighbor points have been selected as neighbor points, and the threshold is set to d_0, where the neighbor point with the shortest distance is j. If the distance between a remaining neighbor point and j is greater than d_0, the remaining neighbor point will be eliminated.

2. Eliminate neighbor points with a relatively large attribute difference in the neighbor points. For example, k nearest neighbor points have been selected as neighbor points, and the threshold is set to r_0, where the neighbor point with the shortest distance is j. If the difference between the attribute values of a remaining neighbor point and j is greater than d_0, the remaining neighbor point will be eliminated.

FIG. 9 is a schematic flowchart of a decoding method 400 based on point cloud attribute prediction according to an embodiment of this disclosure.

As shown in FIG. 9, the decoding method 400 may include:

S410: Acquire a code stream of a point cloud, and parse the code stream of the point cloud to obtain reconstructed information of position information of a target point in the point cloud.

S420: Select N decoded points from M decoded points in the point cloud as N candidate points of the target point, $M \geq N \geq 1$.

S430: Select k neighbor points from the N candidate points based on the reconstructed information of the position information of the target point, $N \geq k \geq 1$.

S440: Determine a predicted value of attribute information of the target point by using attribute values of the k neighbor points, the attribute values of the k neighbor points being reconstructed values of attribute information of the k neighbor points.

S450: Parse the code stream to obtain a residual value of the attribute information of the target point.

S460: Obtain a final reconstructed value of the attribute information of the target point according to the predicted value of the attribute information of the target point and the residual value of the attribute information of the target point.

S470: Obtain a decoded point cloud according to the final reconstructed value of the attribute information of the target point.

In some embodiments, the quantity M of decoded points exceeds the quantity N of candidate points; and S420 may include:

selecting the N decoded points from the M decoded points based on a first order of the M decoded points, the first order being an order obtained by performing Morton sorting or Hilbert sorting on the M decoded points and the target point in ascending order or in descending order, or the first order being a decoding order of the M decoded points and the target point; and determining the N decoded points as the N candidate points.

In this embodiment of this disclosure, after N decoded points are selected from M decoded points in a point cloud as N candidate points of a target point, and k neighbor points are selected from the N candidate points based on reconstructed information of position information of the target point. For a dense point cloud, an excessively large quantity of candidate points for selecting the k neighbor points can be avoided, thereby reducing the prediction complexity. According to another aspect, a predicted value of attribute information of the target point is determined by using attribute values of the k neighbor points, which can ensure prediction accuracy for the attribute information of the target point. Therefore, the solution provided in this disclosure can reduce the prediction complexity on the basis of ensuring the prediction effects.

In some embodiments, S420 may include:

determining, in the first order, N points previous to and adjacent to the target point as the N decoded points; or determining, in the first order, N consecutive points previous to the target point as the N decoded points, the N consecutive points being adjacent to the target point or spaced apart from the target point by at least one decoded point.

In some embodiments, S430 may include:

determining a geometric structure relationship between the N candidate points and the target point based on the reconstructed information of the position information of the target point and reconstructed information of position information of the N candidate points; and selecting the k neighbor points from the N candidate points based on the geometric structure relationship.

In some embodiments, the geometric structure relationship is represented by an octree structure; and S430 may include:

determining k nearest neighbor points of the target point based on the octree structure; and determining the k nearest neighbor points as the k neighbor points.

In some embodiments, S430 may include:

selecting, based on the geometric structure relationship, p candidate points collinear and/or coplanar with the target point from the N candidate points;

determining the p candidate points as the k neighbor points when the quantity p of candidate points is greater than or equal to the quantity k of neighbor points; or selecting k candidate points from the p candidate points as the k neighbor points when the quantity p of candidate points is greater than or equal to the quantity k of neighbor points.

In some embodiments, S430 may include:

selecting, based on the geometric structure relationship, p candidate points collinear and/or coplanar with the target point from the N candidate points;

determining distances between all of the N candidate points and the target point based on the reconstructed information of the position information of the target point and the reconstructed information of the position information of the N candidate points when the quantity p of candidate points is less than the quantity k of neighbor points or the quantity p of candidate points is equal to 0; and selecting the k neighbor points from the N candidate points based on the distances between all of the N candidate points and the target point, the distances between all of the N candidate points and the target point being Euclidean distances or Manhattan distances.

In some embodiments, S430 may include:

selecting, based on the geometric structure relationship, p candidate points collinear and/or coplanar with the target point from the N candidate points;

determining a second order by using the reconstructed information of the position information of the target point and the reconstructed information of the position information of the N candidate points when the quantity p of candidate points is less than the quantity k of neighbor points or the quantity p of candidate points is equal to 0; and selecting the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In some embodiments, S430 may include:

determining distances between all of the N candidate points and the target point based on the reconstructed information of the position information of the target point and reconstructed information of position information of the N candidate points; and selecting the k neighbor points from the N candidate points based on the distances between all of the N candidate points and the target point, the distances between all of the N candidate points and the target point being Euclidean distances or Manhattan distances.

In some embodiments, S430 may include:

determining first target candidate points in the N candidate points as the k neighbor points, the first target candidate point being a point in the N candidate points with a distance to the target point less than a first threshold; or determining second target candidate points in the N candidate points as the k neighbor points, the second target candidate point being a point in the N candidate points with a distance to the target point less than a second threshold.

In some embodiments, S430 may include:

determining a second order by using the reconstructed information of the position information of the target point and reconstructed information of position information of the N candidate points; and selecting the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In some embodiments, S440 may include:

using a reciprocal of a distance between each of the k neighbor points and the target point as a weight of the each neighbor point, performing weighted averaging calculation based on the attribute value and the weight of each of the k neighbor points to obtain a weighted average value of the attribute values of the k neighbor points, and determining the weighted average value of the attribute values of the k neighbor points as the predicted value of the attribute information of the target point; or set the same or different initial weights for different neighbor points in the k neighbor points for weighted averaging calculation, to obtain a weighted average value of the attribute values of the k neighbor points, and the calculated weighted average value of the attribute values of the k neighbor points is determined as the predicted value of the attribute information of the target point based on the attribute value and the initial weight of each of the k neighbor points, the initial weight of each of the k neighbor points decreasing as the distance between the each neighbor point and the target point increases, and the code stream including the initial weight of each of the k neighbor points; or determine the attribute value of a neighbor point in the k neighbor points that is closest to the target point as the predicted value of the attribute information of the target point.

In some embodiments, S440 may include:

discarding first neighbor points and second neighbor points in the k neighbor points to obtain remaining neighbor points in the k neighbor points, the first neighbor point being a neighbor point in the k neighbor points with a distance to a reference point greater than a first threshold, and the second neighbor point being a neighbor point in the k neighbor points with a distance to the reference point greater than or equal to a second threshold, the k neighbor points including the reference point; and determining the predicted value of the attribute information of the target point by using the attribute values of the remaining neighbor points in the k neighbor points.

It is to be understood that for the decoding method 400, reference may be made to the relevant descriptions of encoding method 300, and to avoid repetition, details are not described herein again.

The encoder or decoder provided in the embodiments of this disclosure is described below with reference to the accompanying drawings.

Figure 10:
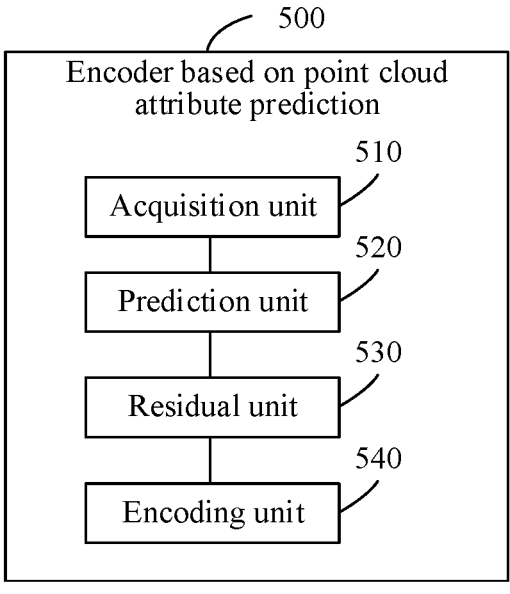
FIG. 10 is a schematic block diagram of an encoder according to an embodiment of this disclosure.

FIG. 10 is a schematic block diagram of an encoder 500 according to an embodiment of this disclosure.

As shown in FIG. 10, the encoder 500 may include:

an acquisition unit 510, configured to acquire reconstructed information of position information of a target point in a point cloud;

a prediction unit 520, configured to: select N encoded points from M encoded points in the point cloud as N candidate points of the target point, M≥N≥1; select k neighbor points from the N candidate points based on the reconstructed information of the position information of the target point, N≥k≥1; and determine a predicted value of attribute information of the target point by using attribute values of the k neighbor points, the attribute values of the k neighbor points being reconstructed values of attribute information of the k neighbor points or original values of the attribute information of the k neighbor points;

a residual unit 530, configured to obtain a residual value of the attribute information of the target point according to the predicted value of the attribute information of the target point and an original value of the attribute information of the target point; and an encoding unit 540, configured to encode the residual value of the attribute information of the target point to obtain a code stream of the point cloud.

In some embodiments, the quantity M of encoded points exceeds the quantity N of candidate points; and the prediction unit 520 is specifically configured to:

select the N encoded points from the M encoded points based on a first order of the M encoded points, the first order being an order obtained by performing Morton sorting or Hilbert sorting on the M encoded points and the target point in ascending order or in descending order, or the first order being an encoding order of the M encoded points and the target point; and use the N encoded points as the N candidate points.

In some embodiments, the prediction unit 520 is specifically configured to:

determine, in the first order, N points previous to and adjacent to the target point as the N encoded points; or determine, in the first order, N consecutive points previous to the target point as the N encoded points, the N consecutive points being adjacent to the target point or spaced apart from the target point by at least one encoded point.

In some embodiments, the prediction unit 520 is specifically configured to:

determine a geometric structure relationship between the N candidate points and the target point based on the reconstructed information of the position information of the target point and reconstructed information of position information of the N candidate points; and select the k neighbor points from the N candidate points based on the geometric structure relationship.

In some embodiments, the geometric structure relationship is represented by an octree structure; and the prediction unit 520 is specifically configured to:

determine k nearest neighbor points of the target point based on the octree structure; and determine the k nearest neighbor points as the k neighbor points.

In some embodiments, the prediction unit 520 is specifically configured to:

select, based on the geometric structure relationship, p candidate points collinear and/or coplanar with the target point from the N candidate points;

determine the p candidate points as the k neighbor points when the quantity p of candidate points is greater than or equal to the quantity k of neighbor points; or select k candidate points from the p candidate points as the k neighbor points when the quantity p of candidate points is greater than or equal to the quantity k of neighbor points.

In some embodiments, the prediction unit 520 is specifically configured to:

select, based on the geometric structure relationship, p candidate points collinear and/or coplanar with the target point from the N candidate points;

determine distances between all of the N candidate points and the target point based on the reconstructed information of the position information of the target point and the reconstructed information of the position information of the N candidate points when the quantity p of candidate points is less than the quantity k of neighbor points or the quantity p of candidate points is equal to 0; and select the k neighbor points from the N candidate points based on the distances between all of the N candidate points and the target point, the distances between all of the N candidate points and the target point being Euclidean distances or Manhattan distances.

In some embodiments, the prediction unit 520 is specifically configured to:

select, based on the geometric structure relationship, p candidate points collinear and/or coplanar with the target point from the N candidate points;

determine a second order by using the reconstructed information of the position information of the target point and the reconstructed information of the position information of the N candidate points when the quantity p of candidate points is less than the quantity k of neighbor points or the quantity p of candidate points is equal to 0; and select the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In some embodiments, the prediction unit 520 is specifically configured to:

determine distances between all of the N candidate points and the target point based on the reconstructed information of the position information of the target point and reconstructed information of position information of the N candidate points; and select the k neighbor points from the N candidate points based on the distances between all of the N candidate points and the target point, the distances between all of the N candidate points and the target point being Euclidean distances or Manhattan distances.

In some embodiments, the prediction unit 520 is specifically configured to:

determine first target candidate points in the N candidate points as the k neighbor points, the first target candidate point being a point in the N candidate points with a distance to the target point less than a first threshold; or determine second target candidate points in the N candidate points as the k neighbor points, the second target candidate point being a point in the N candidate points with a distance to the target point less than a second threshold.

In some embodiments, the prediction unit 520 is specifically configured to:

determine a second order by using the reconstructed information of the position information of the target point and reconstructed information of position information of the N candidate points; and select the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In some embodiments, the prediction unit 520 is specifically configured to:

use a reciprocal of a distance between each of the k neighbor points and the target point as a weight of the each neighbor point, perform weighted averaging calculation based on the attribute value and the weight of each of the k neighbor points to obtain a weighted average value of the attribute values of the k neighbor points, and determine the weighted average value of the attribute values of the k neighbor points as the predicted value of the attribute information of the target point, the code stream including an initial weight of each of the k neighbor points; or set the same or different initial weights for different neighbor points in the k neighbor points, perform weighted averaging calculation based on the attribute value and the initial weight of each of the k neighbor points to obtain a weighted average value of the attribute values of the k neighbor points, and determine the weighted average value of the attribute values of the k neighbor points as the predicted value of the attribute information of the target point, the initial weight of each of the k neighbor points decreasing as the distance between the each neighbor point and the target point increases; or determine the attribute value of a neighbor point in the k neighbor points that is closest to the target point as the predicted value of the attribute information of the target point.

In some embodiments, the prediction unit 520 is specifically configured to:

discard first neighbor points and second neighbor points in the k neighbor points to obtain remaining neighbor points in the k neighbor points, the first neighbor point being a neighbor point in the k neighbor points with a distance to a reference point greater than a first threshold, and the second neighbor point being a neighbor point in the k neighbor points with a distance to the reference point greater than or equal to a second threshold, the k neighbor points including the reference point; and The encoder 500 may also be combined to the encoding framework 100 shown in FIG. 1. That is, the units in the encoder 500 may be replaced or combined with the relevant units in the encoding framework 100. For example, the prediction unit 520 and the residual unit 530 may be configured to implement the relevant functions of the predicting transform unit 113 in the encoding framework 100, and may even be configured to implement the position encoding function and functions before prediction for attribute information. In another example, the encoding unit 540 may be configured to replace the second arithmetic encoding unit 116 in the encoding framework 100.

Figure 11:
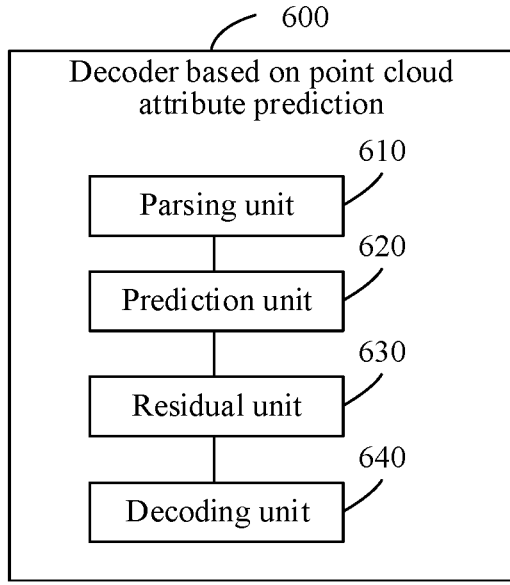
FIG. 11 is a schematic block diagram of a decoder according to an embodiment of this disclosure.

FIG. 11 is a schematic block diagram of a decoder 600 according to an embodiment of this disclosure.

As shown in FIG. 11, the decoder 600 may include:

a parsing unit 610, configured to acquire a code stream of a point cloud, and parse the code stream of the point cloud to obtain reconstructed information of position information of a target point in the point cloud;

a prediction unit 620, configured to: select N decoded points from M decoded points in the point cloud as N candidate points of the target point, M≥N≥1; select k neighbor points from the N candidate points based on the reconstructed information of the position information of the target point, N≥k≥1; and determine a predicted value of attribute information of the target point by using attribute values of the k neighbor points, the attribute values of the k neighbor points being reconstructed values of attribute information of the k neighbor points;

the parsing unit 610 being further configured to parse the code stream to obtain a residual value of the attribute information of the target point;

a residual unit 630, configured to obtain a final reconstructed value of the attribute information of the target point according to the predicted value of the attribute information of the target point and the residual value of the attribute information of the target point; and a decoding unit 640, configured to obtain a decoded point cloud according to the final reconstructed value of the attribute information of the target point.

In some embodiments, the quantity M of decoded points exceeds the quantity N of candidate points; and the prediction unit 620 is specifically configured to:

select the N decoded points from the M decoded points based on a first order of the M decoded points, the first order being an order obtained by performing Morton sorting or Hilbert sorting on the M decoded points and the target point in ascending order or in descending order, or the first order being a decoding order of the M decoded points and the target point; and determine the N decoded points as the N candidate points.

In some embodiments, the prediction unit 620 is specifically configured to:

determine, in the first order, N points previous to and adjacent to the target point as the N decoded points; or determine, in the first order, N consecutive points previous to the target point as the N decoded points, the N consecutive points being adjacent to the target point or spaced apart from the target point by at least one decoded point.

In some embodiments, the prediction unit 620 is specifically configured to:

determine a geometric structure relationship between the N candidate points and the target point based on the reconstructed information of the position information of the target point and reconstructed information of position information of the N candidate points; and select the k neighbor points from the N candidate points based on the geometric structure relationship.

In some embodiments, the geometric structure relationship is represented by an octree structure; and the prediction unit 620 is specifically configured to:

determine k nearest neighbor points of the target point based on the octree structure; and determine the k nearest neighbor points as the k neighbor points.

In some embodiments, the prediction unit 620 is specifically configured to:

select, based on the geometric structure relationship, p candidate points collinear and/or coplanar with the target point from the N candidate points;

determine the p candidate points as the k neighbor points when the quantity p of candidate points is greater than or equal to the quantity k of neighbor points; or select k candidate points from the p candidate points as the k neighbor points when the quantity p of candidate points is greater than or equal to the quantity k of neighbor points.

In some embodiments, the prediction unit 620 is specifically configured to:

select, based on the geometric structure relationship, p candidate points collinear and/or coplanar with the target point from the N candidate points;

determine distances between all of the N candidate points and the target point based on the reconstructed information of the position information of the target point and the reconstructed information of the position information of the N candidate points when the quantity p of candidate points is less than the quantity k of neighbor points or the quantity p of candidate points is equal to 0; and select the k neighbor points from the N candidate points based on the distances between all of the N candidate points and the target point, the distances between all of the N candidate points and the target point being Euclidean distances or Manhattan distances.

In some embodiments, the prediction unit 620 is specifically configured to:

select, based on the geometric structure relationship, p candidate points collinear and/or coplanar with the target point from the N candidate points;

determine a second order by using the reconstructed information of the position information of the target point and the reconstructed information of the position information of the N candidate points when the quantity p of candidate points is less than the quantity k of neighbor points or the quantity p of candidate points is equal to 0; and select the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In some embodiments, the prediction unit 620 is specifically configured to:

determine distances between all of the N candidate points and the target point based on the reconstructed information of the position information of the target point and reconstructed information of position information of the N candidate points; and select the k neighbor points from the N candidate points based on the distances between all of the N candidate points and the target point, the distances between all of the N candidate points and the target point being Euclidean distances or Manhattan distances.

In some embodiments, the prediction unit 620 is specifically configured to:

determine first target candidate points in the N candidate points as the k neighbor points, the first target candidate point being a point in the N candidate points with a distance to the target point less than a first threshold; or determine second target candidate points in the N candidate points as the k neighbor points, the second target candidate point being a point in the N candidate points with a distance to the target point less than a second threshold.

In some embodiments, the prediction unit 620 is specifically configured to:

determine a second order by using the reconstructed information of the position information of the target point and reconstructed information of position information of the N candidate points; and select the k neighbor points from the N candidate points based on the second order, the second order being an order obtained by performing Morton sorting or Hilbert sorting on the N candidate points and the target point in ascending order or in descending order, or the second order being an order obtained after sorting in descending order or ascending order of distances between all of the N candidate points and the target point, the distances between all of the N candidate points and the target point being Euclidean distances or Manhattan distances.

In some embodiments, the prediction unit 620 is specifically configured to:

use a reciprocal of a distance between each of the k neighbor points and the target point as a weight of the each neighbor point, perform weighted averaging calculation based on the attribute value and the weight of each of the k neighbor points to obtain a weighted average value of the attribute values of the k neighbor points, and determine the weighted average value of the attribute values of the k neighbor points as the predicted value of the attribute information of the target point; or set the same or different initial weights for different neighbor points in the k neighbor points, perform weighted averaging calculation based on the attribute value and the initial weight of each of the k neighbor points to obtain a weighted average value of the attribute values of the k neighbor points, and determine the weighted average value of the attribute values of the k neighbor points as the predicted value of the attribute information of the target point, the initial weight of each of the k neighbor points decreasing as the distance between the each neighbor point and the target point increases, and the code stream including the initial weight of each of the k neighbor points; or determine the attribute value of a neighbor point in the k neighbor points that is closest to the target point as the predicted value of the attribute information of the target point.

In some embodiments, the prediction unit 620 is specifically configured to:

discard first neighbor points and second neighbor points in the k neighbor points to obtain remaining neighbor points in the k neighbor points, the first neighbor point being a neighbor point in the k neighbor points with a distance to a reference point greater than a first threshold, and the second neighbor point being a neighbor point in the k neighbor points with a distance to the reference point greater than or equal to a second threshold, the k neighbor points including the reference point.

The decoder 600 may also be combined to the decoding framework 200 shown in FIG. 2. That is, the units in the decoder 600 may be replaced or combined with the relevant units in the decoding framework 200. For example, the parsing unit 610 may be configured to implement the related functions of the predicting transform unit 213 in the decoding framework 200, and may even be configured to implement the related functions of the inverse quantization unit 211 and the second arithmetic decoding unit 210. In another example, the prediction unit 620 and the residual unit 630 may be configured to implement the relevant functions of the predicting transform unit 213. In another example, the decoding unit 640 may be configured to implement the functions of the color space inverse transform unit 215 in the decoding framework 200.

It is to be understood that the apparatus embodiments and the method embodiments may correspond to each other, and for similar descriptions, reference may be made to the method embodiments. To avoid repetition, details are not described herein again. Specifically, the encoder 500 may correspond to the corresponding subject for performing the method 300 in the embodiments of this disclosure, and each unit in the encoder 500 is for implementing the correspond process in the method 300 respectively. Similarly, the decoder 600 may correspond to the corresponding subject for performing the method 400 in the embodiments of this disclosure, and each unit in the decoder 600 is for implementing the corresponding process in the method 400. For brevity, details are not described herein again.

It is to be understood that units of the encoder and the decoder involved in the embodiments of this disclosure may be separately or wholly combined into one or several other units, or one (or more) of the units herein may further be divided into a plurality of units of smaller functions. In this way, same operations can be implemented, and implementation of the technical effects of the embodiments of this disclosure is not affected. The foregoing units are divided based on logical functions. In an actual implementation, a function of one unit may also be implemented by a plurality of units, or functions of a plurality of units are implemented by one unit. In other embodiments of this disclosure, the encoder and the decoder may also include other units. During actual implementation, the functions may also be cooperatively implemented by other units and may be cooperatively implemented by a plurality of units. According to another embodiment of this disclosure, computer-readable instructions (including program code) that can perform the operations in the corresponding method may be run on a general computing device, such as a computer, which includes processing elements and storage elements such as a central processing unit (CPU), a random access memory (RAM), and a read-only memory (ROM), to construct the encoder and the decoder related in the embodiments of this disclosure and implement the encoding method and the decoding method based on point cloud attribute prediction in the embodiments of this disclosure. The computer-readable instructions may be recorded in, for example, a computer-readable storage medium, and may be loaded into any electronic device having a data processing capability by using the computer-readable storage medium, and run in the electronic device, to implement the corresponding method in the embodiments of this disclosure.

In other words, the units mentioned above may be implemented in the form of hardware, may be implemented by instructions in the form of software, or may be implemented in the form of a combination of software and hardware. Specifically, the operations of the method embodiments in the embodiments of this disclosure may be completed by a hardware integrated logical circuit in a processor, or by using instructions in a form of software. The operations of the methods disclosed with reference to the embodiments of this disclosure may be directly performed and completed by using a hardware decoding processor, or may be performed and completed by using a combination of hardware and software in the decoding processor. Optionally, the software may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the operations of the foregoing method embodiments in combination with hardware thereof.

Figure 12:
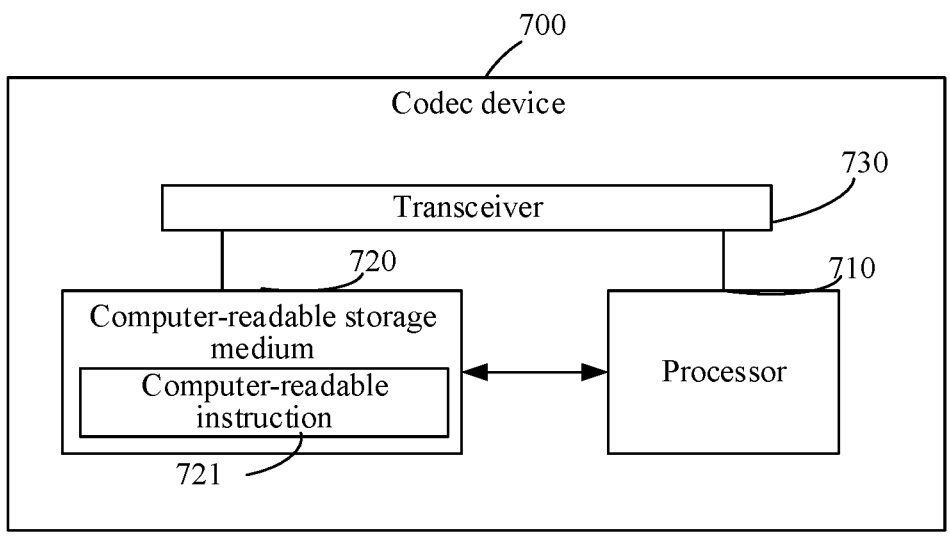
FIG. 12 is a schematic block diagram of an electronic device according to an embodiment of this disclosure.

FIG. 12 is a schematic structural diagram of a codec device 700 according to an embodiment of this disclosure.

As shown in FIG. 12, the codec device 700 includes at least a processor 710 and a computer-readable storage medium 720. The processor 710 and the computer-readable storage medium 720 may be connected by a bus or in another manner. The computer-readable storage medium 720 is configured to store computer-readable instructions 721. The computer-readable instructions 721 includes computer instructions. The processor 710 is configured to execute the computer instructions stored in the computer-readable storage medium 720. The processor 710 is a computing core and a control core of the codec device 700, is suitable for implementing one or more computer instructions, and is specifically suitable for loading and executing the one or more computer instructions to implement a corresponding method procedure or a corresponding function.

For example, the processor 710 may also be referred to as a central processing unit (CPU). The processor 710 may include, but is not limited to, a general purpose processor, a digital signal processor (DSP), an application-specific integrated circuit (ASIC), a field-programmable gate array (FPGA) or another programmable logic device, a discrete gate or a transistor logic device, or a discrete hardware component.

For example, the computer-readable storage medium 720 may be a high-speed RAM or a non-volatile memory, for example, at least one magnetic disk memory. Optionally, the computer-readable storage medium may further be at least one computer-readable storage medium located away from the foregoing processor 710. The computer-readable storage medium 720 may include, but is not limited to, a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM).

In an implementation, the codec device 700 may be the encoding framework 100 shown in FIG. 1 or the encoder 500 shown in FIG. 10. The computer-readable storage medium 720 stores first computer instructions; and the processor 710 loads and executes the first computer instructions stored in the computer-readable storage medium 720 to implement the corresponding operations in the method embodiment shown in FIG. 8. In a specific implementation, the first computer instructions in the computer-readable storage medium 720 are loaded by the processor 710 to perform the corresponding operations. To avoid repetition, details are not described herein again.

In an implementation, the codec device 700 may be the decoding framework 200 shown in FIG. 2 or the decoder 600 shown in FIG. 11. The computer-readable storage medium 720 stores second computer instructions; and the processor 710 loads and executes the second computer instructions stored in the computer-readable storage medium 720 to implement the corresponding operations in the method embodiment shown in or FIG. 9. In a specific implementation, the second computer instructions in the computer-readable storage medium 720 are loaded by the processor 710 to perform the corresponding operations. To avoid repetition, details are not described herein again.

According to another aspect of this disclosure, a non-volatile computer-readable storage medium is provided. The computer-readable storage medium may be a memory device in a codec device 700 and is configured to store programs and data, for example, a computer-readable storage medium 720. It may be understood that the computer-readable storage medium 720 herein may include an internal storage medium of the codec device 700 and may also include an extended storage medium supported by the codec device 700. The computer-readable storage medium provides storage space, and the storage space stores an operating system of the codec device 700. In addition, the storage space further stores one or more computer instructions suitable to be loaded and executed by the processor 710. The computer instructions may be one or more computer-readable instructions 721 (including program code). These computer instructions are configured for a computer to perform the encoding method and the decoding method based on point cloud attribute prediction provided in the various optional manners described above.

According to another aspect of this disclosure, a computer-readable instruction product or computer-readable instructions are provided. The computer-readable instruction product or the computer-readable instructions include computer instructions, and the computer instructions are stored in a computer-readable storage medium. For example, the computer instructions may be computer-readable instructions 721. In this case, the codec device 700 may be a computer, the processor 710 reads the computer instructions from the computer-readable storage medium 720, and executes the computer instructions, to cause the computer to perform the encoding method and the decoding method based on point cloud attribute prediction provided in the various optional manners described above.

In other words, when software is used to implement the embodiments, the embodiments may be implemented completely or partially in a form of a computer-readable instruction product. The computer-readable instruction product includes one or more computer instructions. When the computer instructions are loaded and executed on the computer, the procedures of the embodiments of this disclosure are all or partially run or functions of the embodiments of this disclosure are all or partially implemented. The computer may be a general-purpose computer, a special-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner.

A person of ordinary skill in the art may notice that the exemplary units and procedure operations described with reference to the embodiments disclosed in this specification can be implemented in electronic hardware, or a combination of computer software and electronic hardware. Whether the functions are executed in a mode of hardware or software depends on particular disclosures and design constraint conditions of the technical solutions. A person skilled in the art may use different methods to implement the described functions for each particular disclosure, but it is not to be considered that the implementation goes beyond the scope of this disclosure.

The exemplary implementations of this disclosure are described in detail above with reference to the accompanying drawings. However, this disclosure is not limited to the specific details in the foregoing implementations. In the scope of the technical idea of this disclosure, various simple variants can be made on the technical solution of this disclosure, and the simple variants all belong to the protection scope of this disclosure. For example, the specific technical features described in the above specific implementations may be combined in any suitable manner without contradiction. To avoid unnecessary repetition, various possible combinations are not further described in this disclosure. In another example, the various implementations of this disclosure may be combined without departing from the idea of this disclosure, and such combinations shall also fall within the scope of this disclosure. It is to be further understood that sequence numbers of the foregoing processes do not mean execution sequences in various method embodiments of this disclosure. The execution sequences of the processes should be determined according to functions and internal logic of the processes, and should not be construed as any limitation on the implementation processes of the embodiments of this disclosure.

The foregoing contents are merely specific implementations of this disclosure, but are not intended to limit the protection scope of this disclosure. Any variation or replacement readily figured out by a person skilled in the art within the technical scope disclosed in this disclosure shall fall within the protection scope of this disclosure.

What is claimed is:

1. A decoding method based on point cloud attribute prediction, performed by a codec device, the method comprising:

acquiring a code stream of a point cloud, and parsing the code stream of the point cloud to obtain reconstructed information of position information of a target point in the point cloud;

selecting N decoded points from M decoded points in the point cloud as N candidate points of the target point, wherein N is a subset of M such that $M > N \geq 1$, wherein the selecting of the N decoded points from the M decoded points in the point cloud as the N candidate points of the target point comprises:

selecting the N decoded points from the M decoded points based on a first order of the M decoded points, the first order being selected from one of:

an order obtained by performing Hilbert sorting on the M decoded points and the target point, and a decoding order of the M decoded points and the target point; and determining the N decoded points as the N candidate points; and determining, in the first order, N consecutive points previous to the target point as the N decoded points, the N consecutive points being adjacent to the target point or spaced apart from the target point by at least one decoded point, selecting k neighbor points from the N candidate points based on the reconstructed information of the position information of the target point, wherein $N \geq k \geq 1$, wherein the selecting the k neighbor points from the N candidate points based on a second order, the second order being one of:

an order obtained by performing Hilbert sorting on the N candidate points and the target point, and an order obtained after sorting in descending order or ascending order of distances between all of the N candidate points and the target point, the distances between all of the N candidate points and the target point being Euclidean distances or Manhattan distances;

determining a predicted value of attribute information of the target point based on attribute values of the k neighbor points, the attribute values of the k neighbor points being reconstructed values of attribute information of the k neighbor points;

parsing the code stream to obtain a residual value of the attribute information of the target point;

obtaining a final reconstructed value of the attribute information of the target point according to the predicted value of the attribute information of the target point and the residual value of the attribute information of the target point; and obtaining a decoded point cloud according to the final reconstructed value of the attribute information of the target point.

2. The method according to claim 1, wherein the selecting of the k neighbor points from the N candidate points based on the reconstructed information of the position information of the target point comprises:

determining a geometric structure relationship between the N candidate points and the target point based on the reconstructed information of the position information of the target point and reconstructed information of position information of the N candidate points; and selecting the k neighbor points from the N candidate points based on the geometric structure relationship.

3. The method according to claim 2, wherein the geometric structure relationship is represented by an octree structure, and the selecting of the k neighbor points from the N candidate points based on the geometric structure relationship comprises:

determining k nearest neighbor points of the target point based on the octree structure; and determining the k nearest neighbor points as the k neighbor points.

4. The method according to claim 2, wherein the selecting of the k neighbor points from the N candidate points based on the geometric structure relationship comprises:

selecting, based on the geometric structure relationship, p candidate points collinear and/or coplanar with the target point from the N candidate points; and determining the p candidate points as the k neighbor points when the quantity p of candidate points is greater than or equal to the quantity k of neighbor points; or selecting k candidate points from the p candidate points as the k neighbor points when the quantity p of candidate points is greater than or equal to the quantity k of neighbor points.

5. The method according to claim 2, wherein the selecting of the k neighbor points from the N candidate points based on the geometric structure relationship comprises:

selecting, based on the geometric structure relationship, p candidate points collinear and/or coplanar with the target point from the N candidate points;

determining distances between all of the N candidate points and the target point based on the reconstructed information of the position information of the target point and the reconstructed information of the position information of the N candidate points when the quantity p of candidate points is less than the quantity k of neighbor points or the quantity p of candidate points is equal to 0; and selecting the k neighbor points from the N candidate points based on the distances between all of the N candidate points and the target point.

6. The method according to claim 2, wherein the selecting of the k neighbor points from the N candidate points based on the geometric structure relationship comprises:

selecting, based on the geometric structure relationship, p candidate points collinear and/or coplanar with the target point from the N candidate points;

determining a second order by using the reconstructed information of the position information of the target point and the reconstructed information of the position information of the N candidate points when the quantity p of candidate points is less than the quantity k of neighbor points or the quantity p of candidate points is equal to 0.

7. The method according to claim 1, wherein the selecting of the k neighbor points from the N candidate points based on the reconstructed information of the position information of the target point comprises:

determining distances between all of the N candidate points and the target point based on the reconstructed information of the position information of the target point and reconstructed information of position information of the N candidate points; and selecting the k neighbor points from the N candidate points based on the distances between all of the N candidate points and the target point.

8. The method according to claim 5, wherein the selecting of the k neighbor points from the N candidate points based on the distances between all of the N candidate points and the target point comprises one of:

determining first target candidate points in the N candidate points as the k neighbor points, each first target candidate point being a point in the N candidate points with a distance to the target point less than a first threshold; and determining second target candidate points in the N candidate points as the k neighbor points, each second target candidate point being a point in the N candidate points with a distance to the target point less than a second threshold.

9. The method according to claim 1, wherein the selecting of the k neighbor points from the N candidate points based on the reconstructed information of the position information of the target point comprises:

determining the second order by using the reconstructed information of the position information of the target point and reconstructed information of position information of the N candidate points.

10. The method according to claim 1, wherein the determining of the predicted value of attribute information of the target point based on the attribute values of the k neighbor points comprises one of:

using a reciprocal of a distance between each of the k neighbor points and the target point as a weight of the each neighbor point, performing weighted averaging calculation based on the attribute value and the weight of each of the k neighbor points to obtain a weighted average value of the attribute values of the k neighbor points, and determining the weighted average value of the attribute values of the k neighbor points as the predicted value of the attribute information of the target point;

setting initial weights for different neighbor points in the k neighbor points, performing weighted averaging calculation based on the attribute value and the initial weight of each of the k neighbor points to obtain a weighted average value of the attribute values of the k neighbor points, and determining the weighted average value of the attribute values of the k neighbor points as the predicted value of the attribute information of the target point, the initial weight of each of the k neighbor points decreasing as the distance between the neighbor point and the target point increases, and the code stream comprising the initial weight of each of the k neighbor points; and determining the attribute value of a neighbor point in the k neighbor points that is closest to the target point as the predicted value of the attribute information of the target point.

11. The method according to claim 1, wherein the determining of the predicted value of attribute information of the target point based on the attribute values of the k neighbor points comprises:

discarding first neighbor points and second neighbor points in the k neighbor points to obtain remaining neighbor points in the k neighbor points, each first neighbor point being a neighbor point in the k neighbor points with a distance to a reference point greater than a first threshold, and each second neighbor point being a neighbor point in the k neighbor points with a distance to the reference point greater than or equal to a second threshold, the k neighbor points comprising the reference point; and determining the predicted value of the attribute information of the target point by using the attribute values of the remaining neighbor points in the k neighbor points.

12. An encoding method based on point cloud attribute prediction, performed by a codec device, the method comprising:

acquiring reconstructed information of position information of a target point in a point cloud;

selecting N encoded points from M encoded points in the point cloud as N candidate points of the target point, wherein N is a subset of M such that M>N≥1, wherein the selecting of the N encoded points from the M encoded points in the point cloud as the N candidate points of the target point comprises:

selecting the N encoded points from the M encoded points based on a first order of the M encoded points, the first order being selected from one of:

an order obtained by performing Hilbert sorting on the M encoded points and the target point, and an encoding order of the M encoded points and the target point; and determining, in the first order, N consecutive points previous to the target point as the N encoded points, the N consecutive points being adjacent to the target point or spaced apart from the target point by at least one encoded point, and determining the N encoded points as the N candidate points;

selecting k neighbor points from the N candidate points based on the reconstructed information of the position information of the target point, wherein N≥k≥1, wherein the selecting the k neighbor points from the N candidate points is based on a second order, the second order being one of:

an order obtained by performing Hilbert sorting on the N candidate points and the target point, and an order obtained after sorting in descending order or ascending order of distances between all of the N candidate points and the target point, the distances between all of the N candidate points and the target point being Euclidean distances or Manhattan distances;

determining a predicted value of attribute information of the target point based on attribute values of the k neighbor points, the attribute values of the k neighbor points being reconstructed values of attribute information of the k neighbor points or original values of the attribute information of the k neighbor points;

obtaining a residual value of the attribute information of the target point according to the predicted value of the attribute information of the target point and an original value of the attribute information of the target point; and encoding the residual value of the attribute information of the target point to obtain a code stream of the point cloud.

13. A decoder based on point cloud attribute prediction, comprising:

at least one memory configured to store program code; and at least one processor configured to read the program code and operate as instructed by the program code, the program code including:

first parsing code configured to cause the at least one processor to acquire a code stream of a point cloud, and parse the code stream of the point cloud to obtain reconstructed information of position information of a target point in the point cloud;

prediction code configured to cause the at least one processor to: select N decoded points from M decoded points in the point cloud as N candidate points of the target point, wherein N is a subset of M such that M>N≥1, wherein the selection of the N decoded points from the M decoded points in the point cloud as the N candidate points of the target point comprises:

selection of the N decoded points from the M decoded points based on a first order of the M decoded points, the first order being selected from one of:

an order obtained by performing Hilbert sorting on the M decoded points and the target point, and an encoding order of the M decoded points and the target point; and a determination, in the first order, of N consecutive points previous to the target point as the N encoded points, the N consecutive points being adjacent to the target point or spaced apart from the target point by at least one encoded point, and determining the N decoded points as the N candidate points;

selecting code configured to cause the at least one processor to select k neighbor points from the N candidate points based on the reconstructed information of the position information of the target point, N≥k≥1, wherein the selection of the k neighbor points from the N candidate points is based on a second order, the second order being one of:

an order obtained by performing Hilbert sorting on the N candidate points and the target point, and an order obtained after sorting in descending order or ascending order of distances between all of the N candidate points and the target point, the distances between all of the N candidate points and the target point being Euclidean distances or Manhattan distances; and determining code configured to cause the at least one processor to determine a predicted value of attribute information of the target point by using attribute values of the k neighbor points, the attribute values of the k neighbor points being reconstructed values of attribute information of the k neighbor points;

second parsing coded configured to cause the at least one processor to parse the code stream to obtain a residual value of the attribute information of the target point;

residual code configured to cause the at least one processor to obtain a final reconstructed value of the attribute information of the target point according to the predicted value of the attribute information of the target point and the residual value of the attribute information of the target point; and decoding code configured to cause the at least one processor to obtain a decoded point cloud according to the final reconstructed value of the attribute information of the target point.

14. An encoder based on point cloud attribute prediction, comprising:

at least one memory configured to store program code; and at least one processor configured to read the program code and operate as instructed by the program code, the program code including:

acquisition code configured to cause the at least one processor to acquire reconstructed information of position information of a target point in a point cloud;

prediction code configured to cause the at least one processor to:

select N encoded points from M encoded points in the point cloud as N candidate points of the target point, wherein N is a subset of M such that M>N≥1, wherein the selection of the N decoded points from the M decoded points in the point cloud as the N candidate points of the target point comprises:

selection of the N encoded points from the M encoded points based on a first order of the M encoded points, the first order being selected from one of:

an order obtained by performing Hilbert sorting on the M encoded points and the target point, and an encoding order of the M encoded points and the target point; and a determination, in the first order, of N consecutive points previous to the target point as the N encoded points, the N consecutive points being adjacent to the target point or spaced apart from the target point by at least one encoded point and determining the N encoded points as the N candidate points;

select k neighbor points from the N candidate points based on the reconstructed information of the position information of the target point, N≥k≥1, wherein the selection of the k neighbor points from the N candidate points is based on a second order, the second order being one of:

an order obtained by performing Hilbert sorting on the N candidate points and the target point, and an order obtained after sorting in descending order or ascending order of distances between all of the N candidate points and the target point, the distances between all of the N candidate points and the target point being Euclidean distances or Manhattan distances; and determine a predicted value of attribute information of the target point by using attribute values of the k neighbor points, the attribute values of the k neighbor points being reconstructed values of attribute information of the k neighbor points or original values of the attribute information of the k neighbor points;

residual code configured to cause the at least one processor to obtain a residual value of the attribute information of the target point according to the predicted value of the attribute information of the target point and an original value of the attribute information of the target point; and encoding code configured to cause the at least one processor to encode the residual value of the attribute information of the target point to obtain a code stream of the point cloud.

15. A non-transitory computer-readable storage medium, configured to store computer-readable instructions, the computer-readable instructions causing a processor to perform a decoding method based on point cloud attribute prediction, the method comprising:

acquiring a code stream of a point cloud, and parsing the code stream of the point cloud to obtain reconstructed information of position information of a target point in the point cloud;

selecting N decoded points from M decoded points in the point cloud as N candidate points of the target point, wherein N is a subset of M such that M>N≥1, wherein the selecting of the N decoded points from the M decoded points in the point cloud as the N candidate points of the target point comprises:

selecting the N decoded points from the M decoded points based on a first order of the M decoded points, the first order being selected from one of:

an order obtained by performing Hilbert sorting on the M decoded points and the target point, and a decoding order of the M decoded points and the target point; and determining the N decoded points as the N candidate points; and determining, in the first order, N consecutive points previous to the target point as the N encoded points, the N consecutive points being adjacent to the target point or spaced apart from the target point by at least one encoded point;

selecting k neighbor points from the N candidate points based on the reconstructed information of the position information of the target point, wherein N≥k≥1, wherein the selecting the k neighbor points from the N candidate points based on a second order, the second order being one of:

an order obtained by performing Hilbert sorting on the N candidate points and the target point, and an order obtained after sorting in descending order or ascending order of distances between all of the N candidate points and the target point, the distances between all of the N candidate points and the target point being Euclidean distances or Manhattan distances;

determining a predicted value of attribute information of the target point based on attribute values of the k neighbor points, the attribute values of the k neighbor points being reconstructed values of attribute information of the k neighbor points;

parsing the code stream to obtain a residual value of the attribute information of the target point;

obtaining a final reconstructed value of the attribute information of the target point according to the predicted value of the attribute information of the target point and the residual value of the attribute information of the target point; and obtaining a decoded point cloud according to the final reconstructed value of the attribute information of the target point.

16. A non-transitory computer-readable storage medium, configured to store computer-readable instructions, the computer-readable instructions causing a processor to perform an encoding method based on point cloud attribute prediction, the method comprising:

acquiring reconstructed information of position information of a target point in a point cloud;

selecting N encoded points from M encoded points in the point cloud as N candidate points of the target point, wherein N is a subset of M such that M>N≥1, wherein the selecting of the N decoded points from the M decoded points in the point cloud as the N candidate points of the target point comprises:

selecting the N encoded points from the M encoded points based on a first order of the M encoded points, the first order being selected from one of:

an order obtained by performing Hilbert sorting on the M encoded points and the target point, and an encoding order of the M encoded points and the target point; and determining, in the first order, N consecutive points previous to the target point as the N encoded points, the N consecutive points being adjacent to the target point or spaced apart from the target point by at least one encoded point, and determining the N encoded points as the N candidate points;

selecting k neighbor points from the N candidate points based on the reconstructed information of the position information of the target point, wherein N≥k≥1, wherein the selecting the k neighbor points from the N candidate points based on a second order, the second order being one of:

an order obtained by performing Hilbert sorting on the N candidate points and the target point, and an order obtained after sorting in descending order or ascending order of distances between all of the N candidate points and the target point, the distances between all of the N candidate points and the target point being Euclidean distances or Manhattan distances;

determining a predicted value of attribute information of the target point based on attribute values of the k neighbor points, the attribute values of the k neighbor points being reconstructed values of attribute information of the k neighbor points or original values of the attribute information of the k neighbor points;

obtaining a residual value of the attribute information of the target point according to the predicted value of the attribute information of the target point and an original value of the attribute information of the target point; and encoding the residual value of the attribute information of the target point to obtain a code stream of the point cloud.

* * * * *